United States Patent [19]
Johnson

[11] Patent Number: 4,934,612
[45] Date of Patent: Jun. 19, 1990

[54] AUTOMATIC FORAGE HARVESTER SHEARBAR ADJUSTING

[75] Inventor: Stanley J. Johnson, Cedar Falls, Iowa

[73] Assignee: Deere & Company, Moline, Ill.

[21] Appl. No.: 398,285

[22] Filed: Aug. 23, 1989

Related U.S. Application Data

[63] Continuation of Ser. No. 174,069, Mar. 28, 1988, abandoned.

[51] Int. Cl.$^5$ .............................................. B02C 25/00
[52] U.S. Cl. .................................. 241/37; 241/101.7; 241/241
[58] Field of Search ............... 241/37, 241, 101.7, 241/101.2, 221, 222, 286

[56] References Cited

U.S. PATENT DOCUMENTS

| | | | |
|---|---|---|---|
| 2,727,694 | 12/1955 | Helmick et al. | 241/37 |
| 3,769,666 | 11/1973 | Kaufman. | |
| 4,055,309 | 10/1977 | Fleming et al. | |
| 4,190,209 | 2/1980 | deBuhr et al. | |
| 4,198,006 | 4/1980 | Rolfe. | |
| 4,205,797 | 6/1980 | Bennett, Jr. et al. | |
| 4,233,600 | 11/1980 | Rogers et al. | 241/37 X |
| 4,295,616 | 10/1981 | Hill. | |
| 4,335,569 | 6/1982 | Keeney et al. | |
| 4,412,212 | 10/1983 | Kolegraff et al. | |
| 4,436,248 | 3/1984 | Lindblom et al. | |
| 4,474,336 | 10/1984 | Fleming | 241/241 X |
| 4,479,346 | 10/1984 | Chandler. | |
| 4,495,734 | 1/1985 | Rauch. | |
| 4,573,849 | 3/1986 | Johnson et al. | |
| 4,678,130 | 7/1987 | Martenas. | |
| 4,712,743 | 12/1987 | Nordin | 241/37 X |
| 4,799,625 | 1/1989 | Weaver, Jr. et al. | |

FOREIGN PATENT DOCUMENTS

| | | |
|---|---|---|
| 3010416 | 9/1981 | Fed. Rep. of Germany. |
| 3345749 | 6/1984 | Fed. Rep. of Germany. |
| 1187377 | 4/1970 | United Kingdom. |
| 2169181 | 7/1986 | United Kingdom. |

OTHER PUBLICATIONS

John Deere Operator's Manual, p. 24.
Sperry-New Holland Service Manual.
E. C. Lundahl, Inc., "Knife Sharpening", 5 Mar. 1980, pp. 173, 34, 234, etc.

*Primary Examiner*—Mark Rosenbaum

[57] ABSTRACT

An automatic forage harvester shearbar-cutterhead clearance adjusting system includes motors connected to conventional left and right shearbar adjusting mechanisms. A knock sensor senses contact between the shearbar and the rotating knives of the cutterhead. A control unit including a programmed microprocessor controls the motors and, responding to signals from the knock sensors, automatically adjusts the shearbar-cutterhead clearance. The control unit prevents machine damage by responding to various fault conditions.

4 Claims, 33 Drawing Sheets

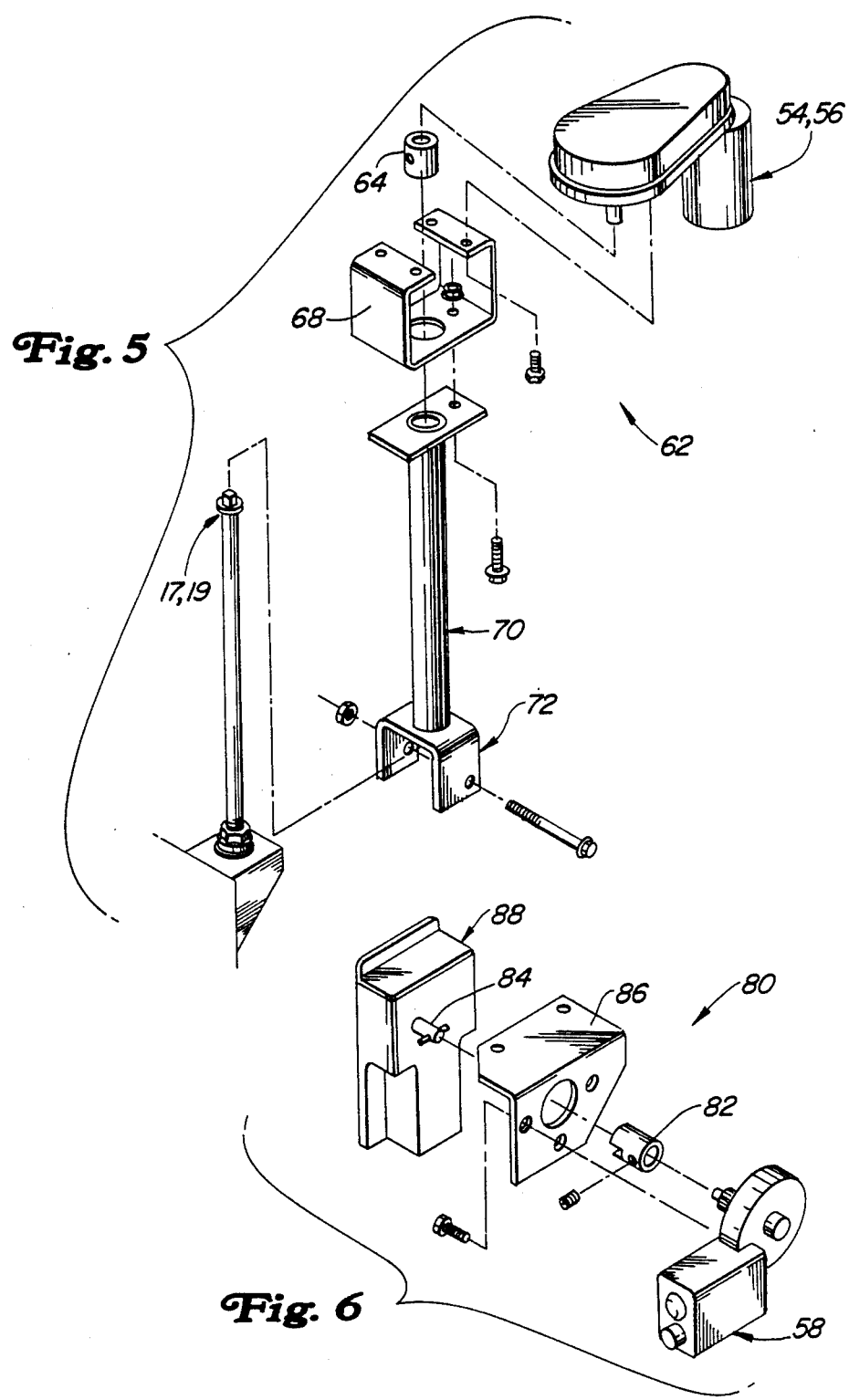

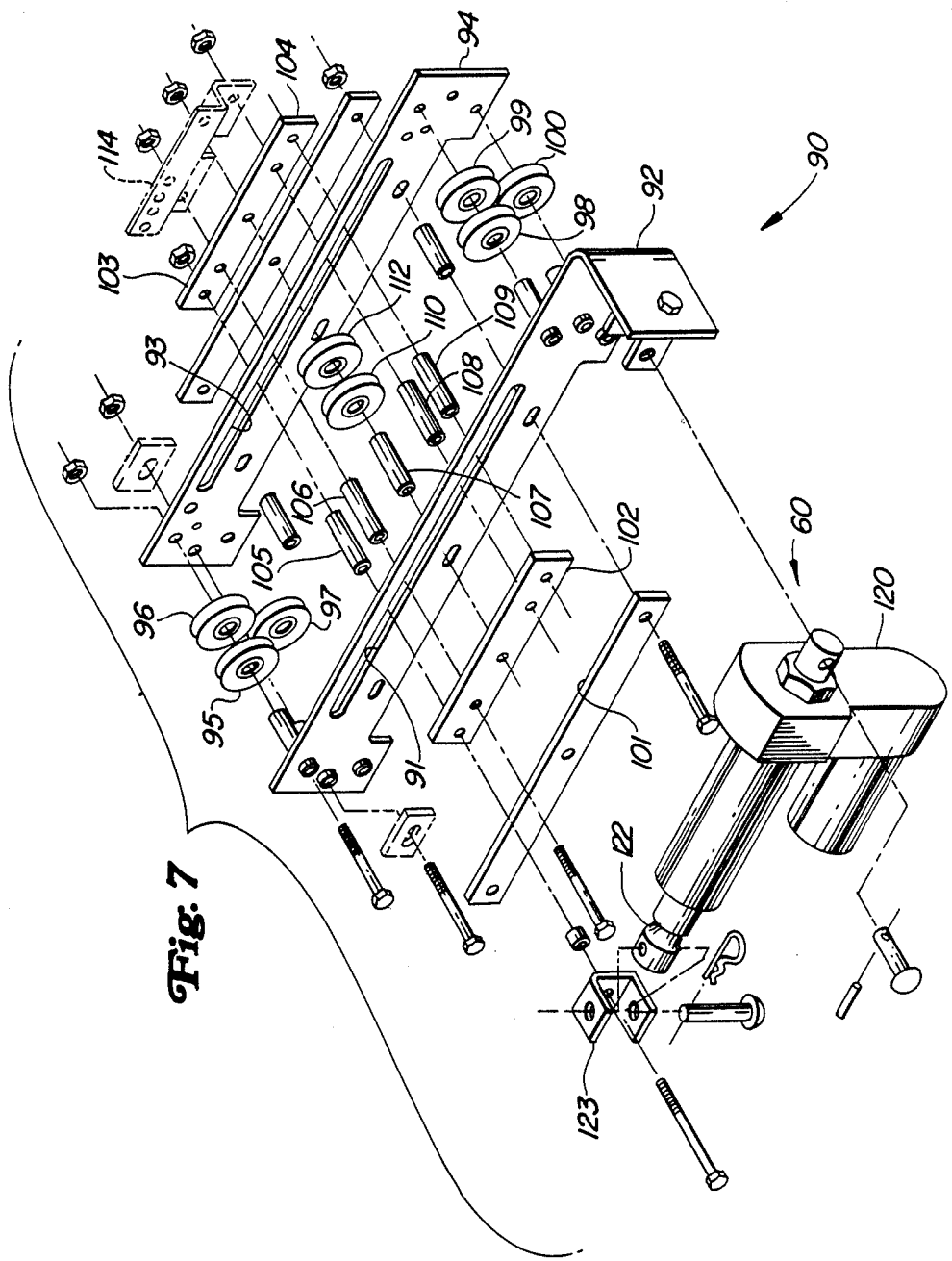

4,934,612

AUTOMATIC FORAGE HARVESTER SHEARBAR ADJUSTING

This application is a continuation of application Ser. No. 07/174,069 filed Mar. 28, 1988, now abandoned.

BACKGROUND OF THE INVENTION

This application includes a microfiche appendix including 1 microfiche and 27 frames.

A portion of the disclosure of this patent document contains material which is subject to a claim of copyright protection. The copyright owner has no objection to the facsimile reproduction by anyone of the patent document or the patent disclosure, as it appears in the Patent and Trademark Office patent file or records, but otherwise reserves all other rights whatsoever.

This invention relates to a system for automatically adjusting the clearance between the shearbar and the cutterhead of a material cutting or chopping mechanism, such as an agricultural forage harvester.

With current production forage harvesters, it has been found necessary to maintain a shearbar-cutterhead clearance of less than 0.015 inch in order to maximize machine efficiency through reduced power consumption. Various mechanisms to adjust the shearbar-cutterhead clearance are disclosed in U.S. Pat. Nos. 4,055,309; 4,190,209; 4,295,616 and 4,436,248. However, all of these mechanisms depend upon manual control of the shearbar adjustment. Magnetic-electronic shearbar-cutterhead clearance sensing systems are disclosed in U.S. Pat. Nos. 4,198,006; 4,412,212 and 4,205,797. However, these systems merely measure the shearbar-cutterhead clearance, but do not provide any means for moving the shearbar to a desired clearance.

A shearbar adjusting system has been proposed wherein the shearbar is moved by electric motors controlled by various switches and a hard-wired circuit including discrete electrical circuit components. However, in this system, the shearbar is electrically insulated from the forage harvester frame and contact between the conducting shearbar and the cutterhead is sensed when an electrical circuit is completed thereby. However, such a system is undesirable because typical insulators are destroyed by the shock and vibration to which they are exposed when they are coupled to a shearbar in a forage harvester. Furthermore, if a wire were to break in such a system, then the system would not detect shearbar-cutterhead contact and the shearbar would be driven into the cutterhead past the point of initial contact and catastrophic physical damage could result. Finally, such a system does not utilize a microprocessor, and is therefore functionally limited. For example, this proposed system does not include any means for automatic shutdown or shearbar withdrawal in the event of certain failure conditions.

SUMMARY OF THE INVENTION

An object of the present invention is to provide such a system which automatically provides accurate adjustment of the cutterhead-shearbar clearance.

Another object of the present invention is to provide such a system which prevents machine damage by automatically responding to various fault conditions.

Another object of the present invention is to provide an automatic forage harvester shearbar adjusting system which utilizes a programmed digital computer, such as a microprocessor.

These and other objects are achieved by the present invention wherein electric motors are connected to left and right shearbar adjusting mechanisms. Accoustic knock sensors sense contact between the shearbar and the rotating cutterhead knives. A control unit includes a microprocessor which is programmed to automatically cause the motors to adjust the shearbar-cutterhead clearance and to respond to various fault conditions.

BRIEF DESCRIPTION OF THE DRAWINGS

FIGS. 4b-4d are detailed schematic electrical diagrams of the electronic control system of FIG. 4a.

FIG. 5 is an exploded view of a shearbar adjusting mechanism of the present invention.

FIG. 6 is an exploded view of the sharpening stone vertical positioning motor and coupling of the present invention.

FIG. 7 is an exploded view of the stone sweep assembly of the present invention.

DETAILED DESCRIPTION

Figure 1:
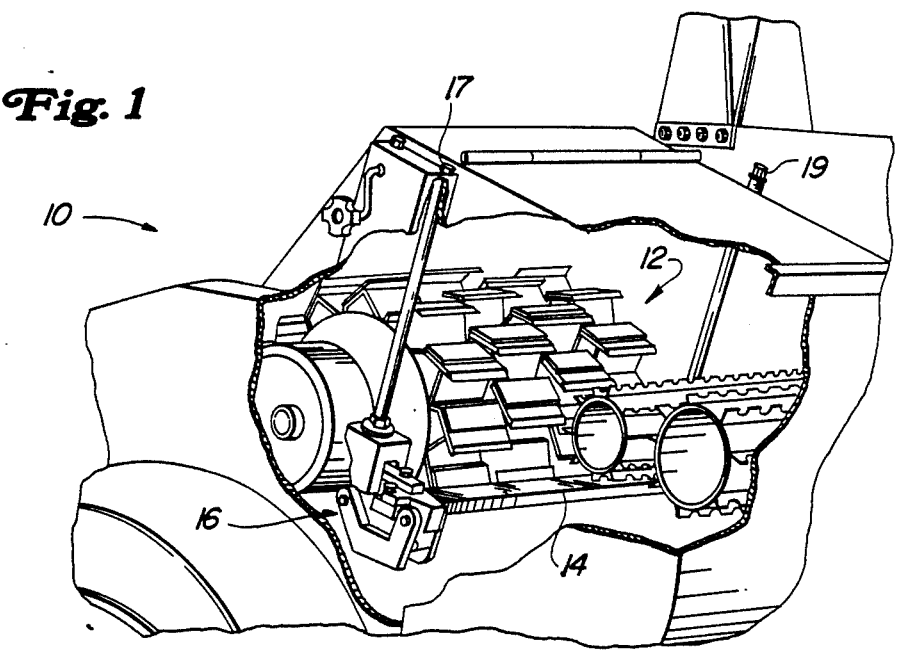
FIG. 1 is a view of a conventional forage harvester with portions cut away to expose the conventional mechanical shearbar adjusting mechanism.

Referring to FIG. 1, a conventional forage harvester 10 (such as a self-propelled or pull-type forage harvester manufactured by Deere & Company) includes a rotary cutterhead 12 with a plurality of knives thereon. The cutterhead 12 rotates next to a stationary knife or shearbar 14 to cut crop therebetween. Such a conventional forage harvester also includes left and right mechanical shearbar adjusting mechanisms 16 (only one of which is visible in FIG. 1) which are manually operable through the turning of bolts 17, 19 to adjust the separation between the shearbar 14 and the cutterhead knives. The details of the adjusting mechanisms 16, 18 are not being described since such mechanisms are well known and are described in detail in U.S. Pat. No. 4,190,209, assigned to the assignee herein.

Figure 2:
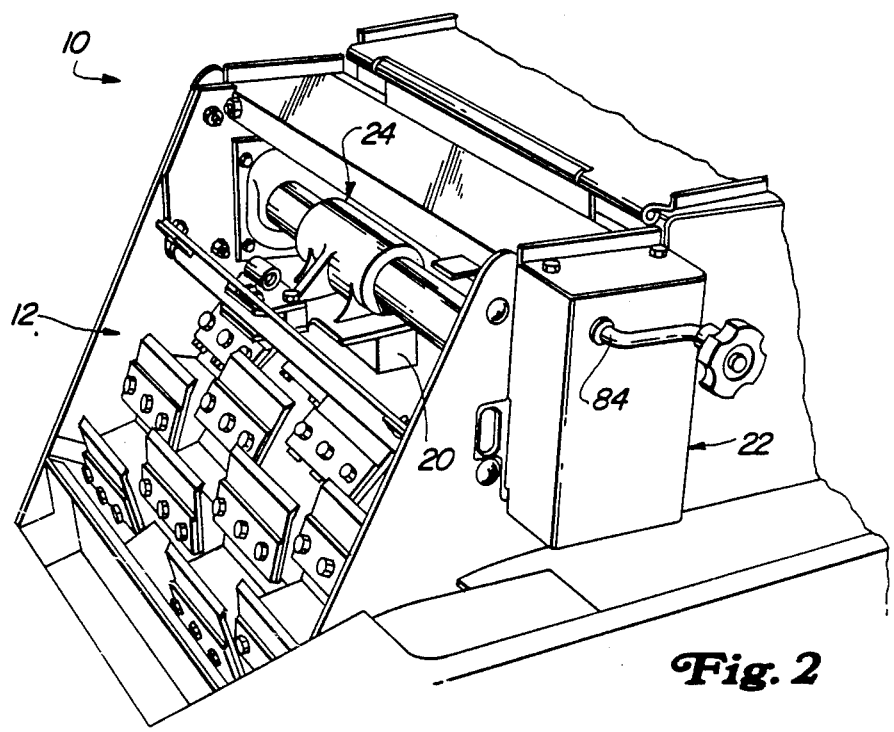
FIG. 2 is a right rear perspective of the conventional cutterhead housing with an access door in an open position to expose portions of a stone carriage mechanism modified according to the present invention.

Referring to FIG. 2, such a conventional forage harvester also includes a sharpening stone 20, and a manually operable mechanical stone adjusting mechanism 22 which operates to move the stones towards and away from the cutterhead knives, and a stone carrier 24 which is manually operable to sweep the stone laterally across the knives. Such conventional stone adjusting and stone carrier mechanisms are well known and are described in detail in U.S. Pat. No. 4,189,875 also assigned to the assignee herein.

Figure 3:
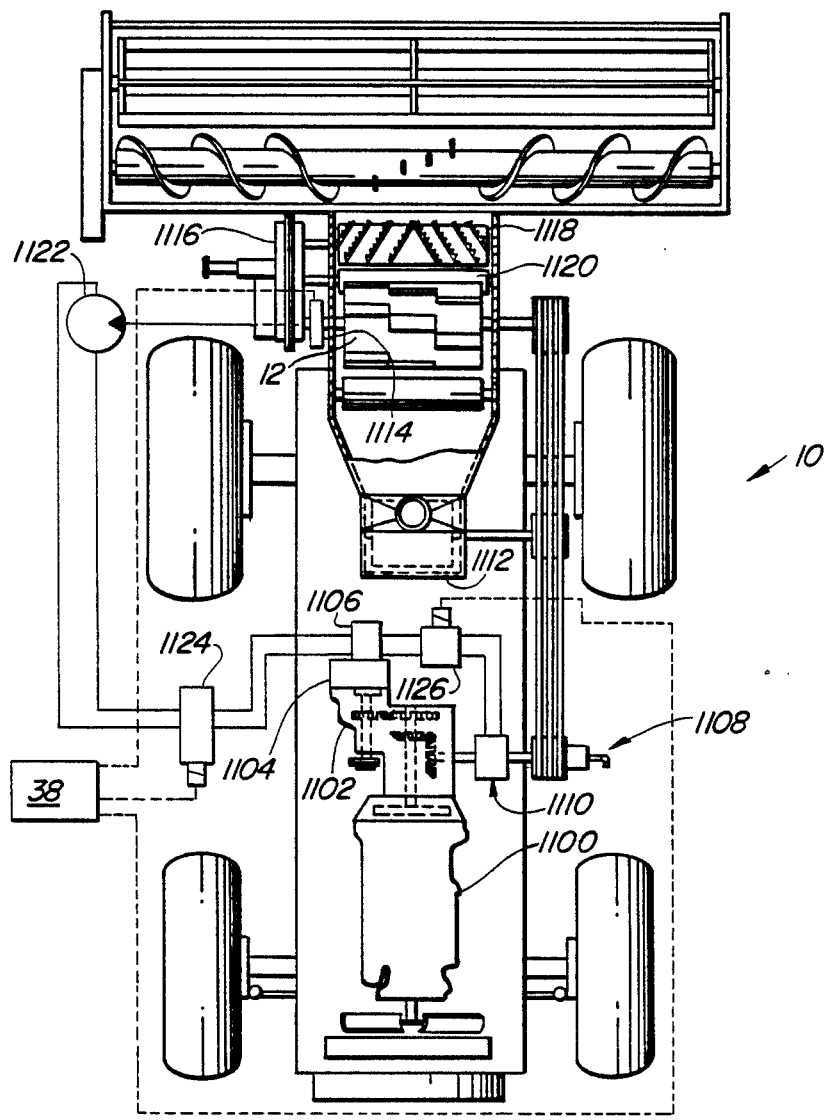
FIG. 3 is a simplified schematic diagram of a forage harvester cutterhead feed roll drive system.

Referring now to FIG. 3, the forage harvester 10 includes an engine 1100 which, via a bevel gear box 1102, drives a hydrostatic pump 1104 and a service hydraulic pump 1106. Gear box 1102 also drives drive belt 1108 via an electronically controlled, hydraulically actuated main clutch 1110. The belt 1108 drives the forage harvester cutterhead 12 and the blower 1112. The drive to the cutterhead 12 is also connected via a conventional electrically operated clutch 1114 to a feed roll gear box 1116 which drives the feed rolls 1118, 1120. A one-way hydraulic reverser motor 122 is coupled to the gear box 1116 to drive the cutterhead 12 in reverse during knife sharpening. Motor 1122 is powered by hydraulic pressure supplied from pump 1106 and communicated to motor 1122 via solenoid operated valve 1124. A solenoid operated valve 1126 controls fluid communication between pump 1106 and main clutch 1110. A reverse rotation switch 38 is connected to valves 1124 and 1126 so that an operator can actuate switch 38 to disengage main clutch 1110, engage clutch 1114 and cause motor 1122 to drive the cutterhead 12 in reverse as is required during knife sharpening. Switch 38 is preferably mounted on a control panel (not shown).

Referring now to FIGS. 4a-4d, a control system for automatically controlling the position of shearbar 14 and for automatically sharpening the cutterhead knives includes a microprocessor U4 (such as a 68705R3 microprocessor manufactured by Motorola or a suitable alternative) connected to various sensors and motors as will now be described. A conventional mag-pickup type rotation speed sensor 32 senses rotation speed of the cutterhead 12 and is preferably mounted next to a cutterhead drive gear (not shown), thereby supplying the microprocessor U4 with a signal representing the rotation speed of the cutterhead. The signal from mag pickup 32 is preferably conditioned by a circuit 33 which includes a low pass filter to reduce effects of electromagnetic interference (EMI) which provides the microprocessor U4 with a square wave of between 0 and +5 volts.

In a conventional forage harvester the shearbar is firmly and slidably connected to a bed (not shown). The bed is welded to a support member (not shown) which extends downwardly therefrom to an end which is welded to a frame part (not shown) of the forage harvester. According to the present invention, a pair of commercially available knock sensors 34, 36 are mounted spaced apart a few inches from each other in threaded bores in the support member (not shown). The location of the knock sensors is not critical, as long as they are mounted in a location which permits them to detect impacts between the cutterhead knives and stone 20 and the shearbar 14. The knock sensors supply signals to the microprocessor U4 when the shearbar 14 or the stone 20 engages the rotating knives of the cutterhead 12.

The knock sensors 34, 36 are preferably connected to the microprocessor via identical signal processing circuits 35. Each circuit 35 includes a low pass EMI filter, a peak voltage detecting circuit C1 which feeds a voltage from 0 to 3 volts, representing the envelope of the knock sensor waveform, to an input of separate low and high threshold comparators C2, C3. The output of C2 goes low when its (−) input is greater than approximately 1 volt, and the output of C3 goes low when its (−) input is greater than approximately 3 volts. By comparing the various comparator outputs, a routine (see FIG. 16.) executed by the microprocessor U4 can analyze the condition of the mag pickup 34, 36.

The reverse rotation switch 38 is connected to provide the microprocessor U4 with a signal indicative of when the cutterhead 12 is rotating in reverse.

A stone up limit switch 40 senses when the sharpening stone 20 is at the limit of its movement radially outwardly from the cutterhead 12. A stone sweep in limit switch 42 and a stone sweep out limit switch 44 sense when the stone 20 is at the ends of its horizontal sweeping motion. Further details regarding the locations of switches 38, 40 and 42 will be described later herein.

Switches 38-44 are preferably coupled to microprocessor U4 via identical circuits which include an EMI noise filter and a voltage clamping circuit which applies a voltage of approximately 5.6 volts to the microprocessor U4 when the switch is closed.

The microprocessor U4 also receives inputs from an adjust shearbar control swtich 46, a knife sharpening control switch 48, a terminate switch 49 and a sharpening cycle control potentiometer 50, all which are preferably mounted on a control panel (not shown) accessible to a human operator. In addition, it is preferable to have ferrite bead EMI suppressors (not shown) inserted in the lines connecting the microprocessor U4 to switches 46, 48, 49 and potentiometer 50.

The microprocessor U4 provides output signals to a group of 4 illuminable display devices 52, such as LEDs, which are preferably mounted on a control panel (not shown) to provide the operator with an indication of the position of the sharpening stone 20 as it sweeps back and forth during a sharpening operation. The LEDs 52 can also be utilized to display error codes or messages generated by the microprocessor as described later. In such a case, the LEDs would be lit in different patterns corresponding to the different error codes. Alternatively, the error codes could be displayed as numbers on a conventional digital numerical display device (not shown).

Figure 4A:
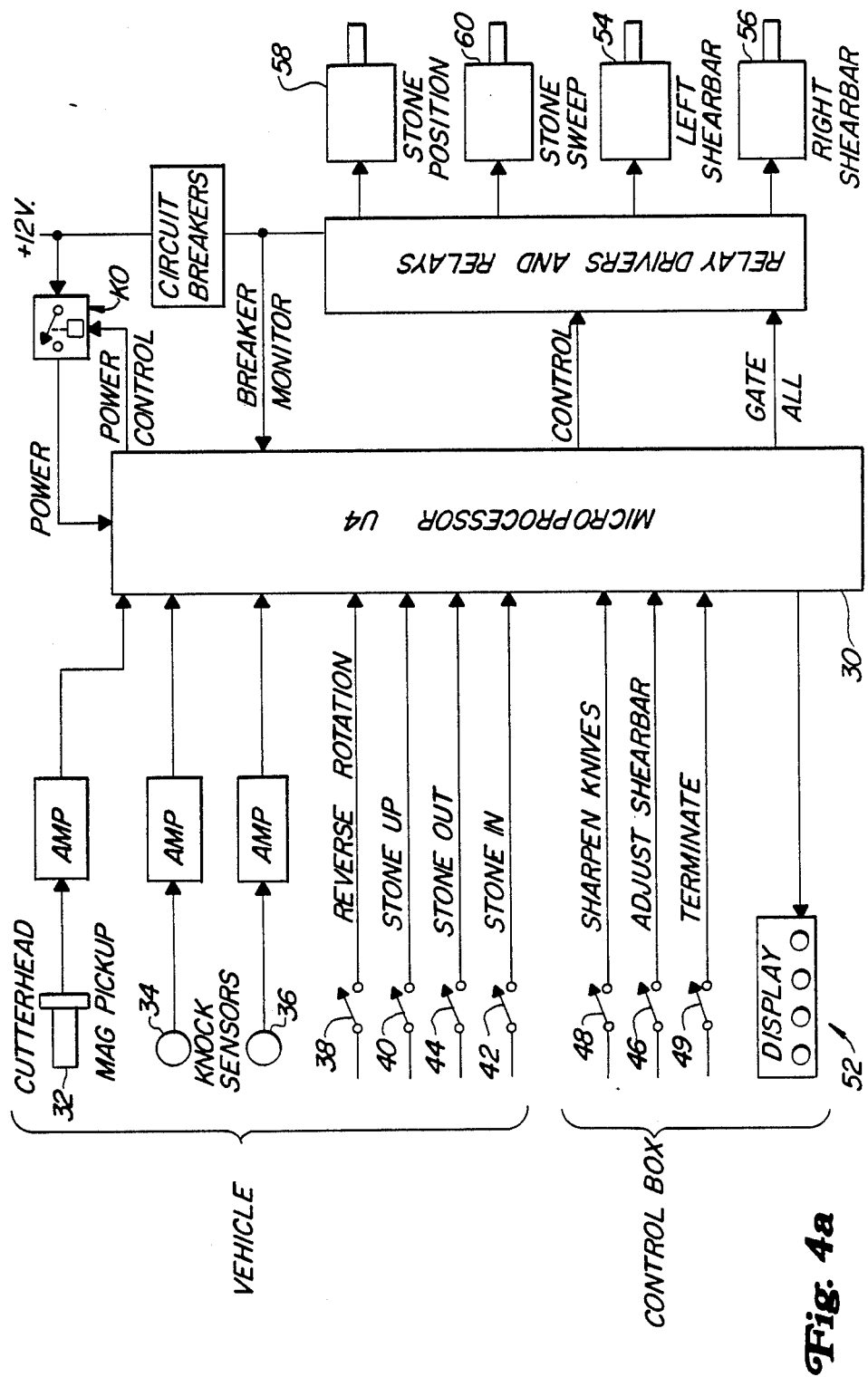
FIG. 4a is a simplified schematic diagram of the electronic control system of the present invention.
Figure 4B:
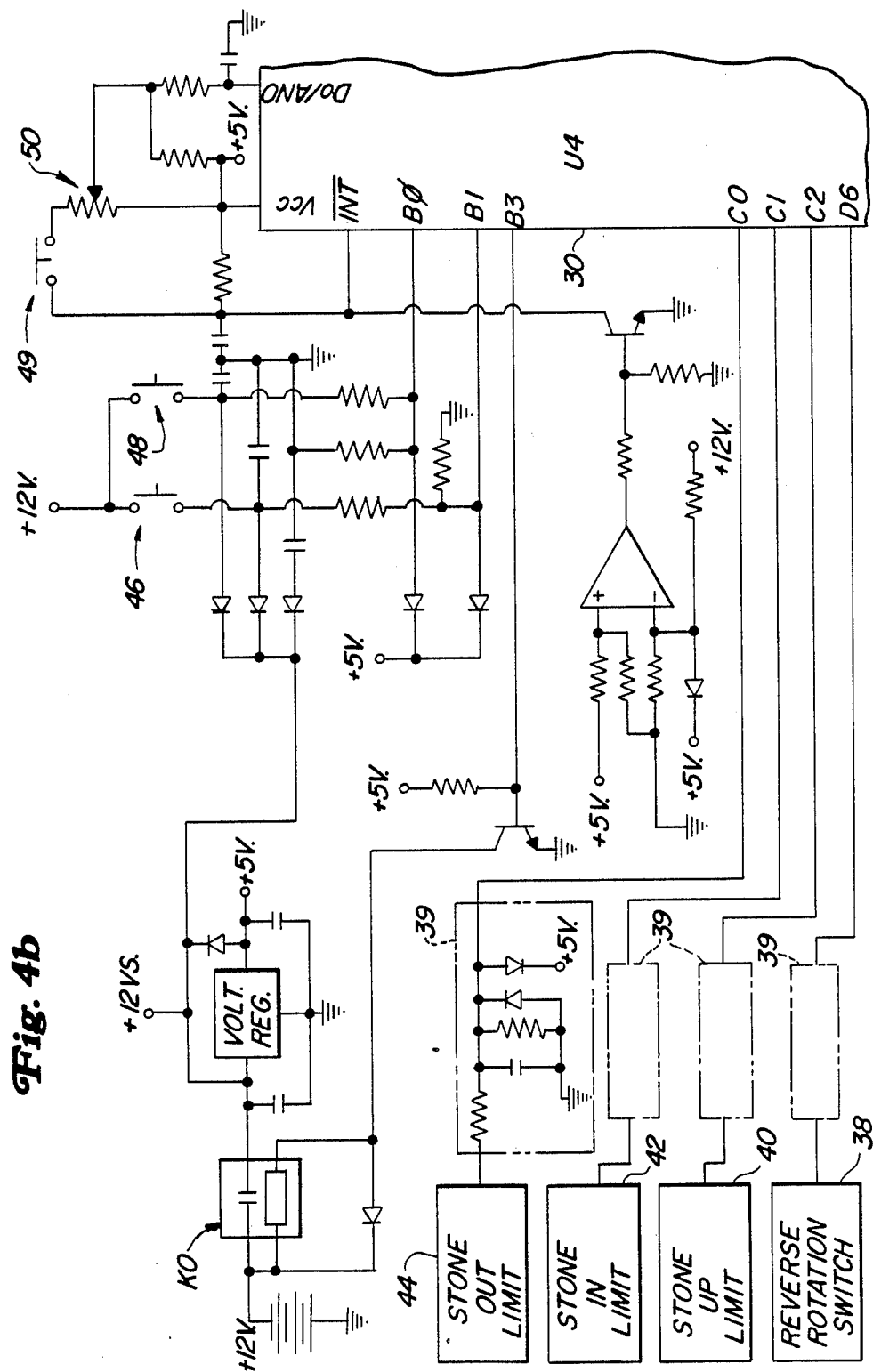
Figure 4C:
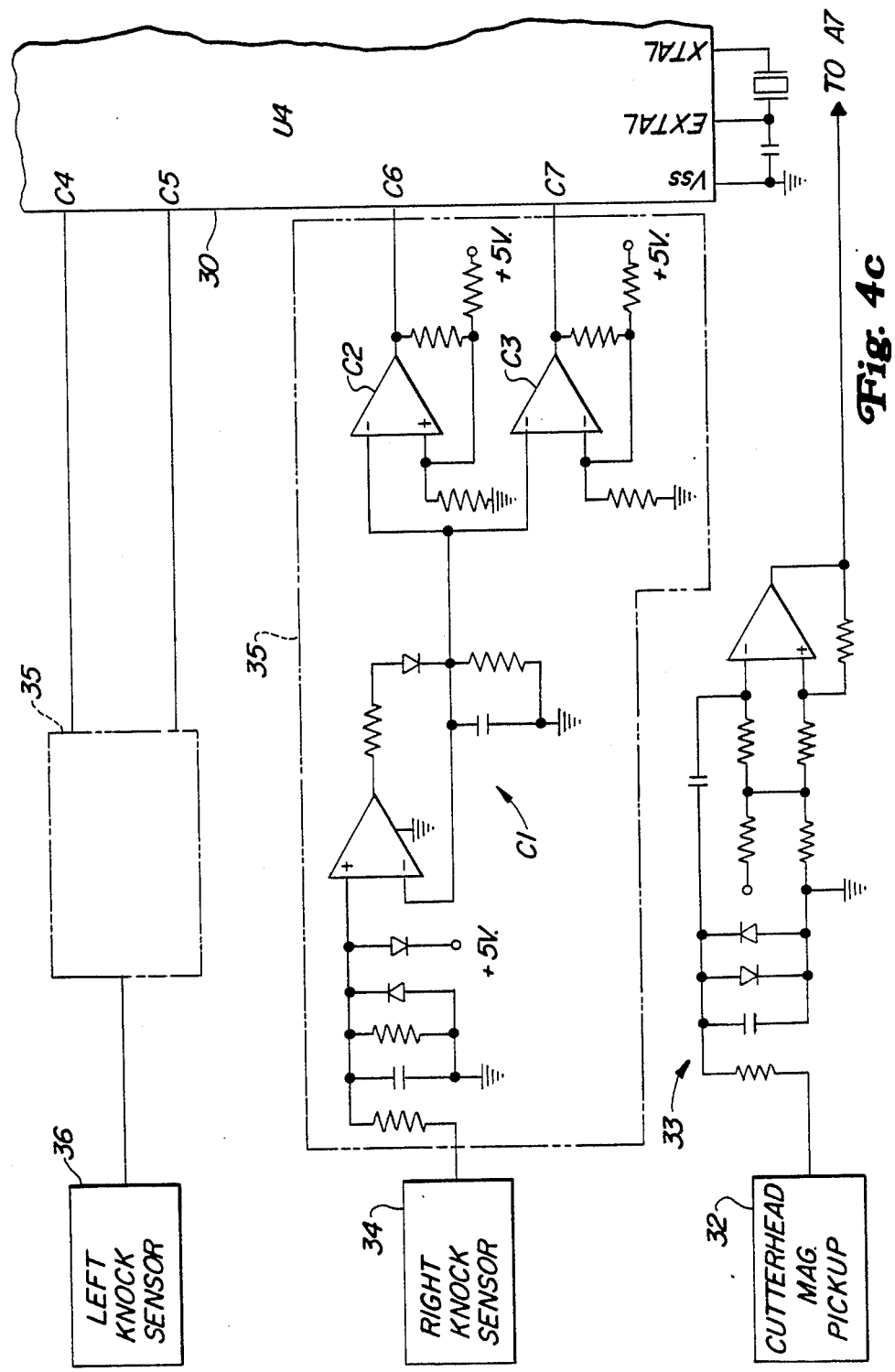
Figure 4D:
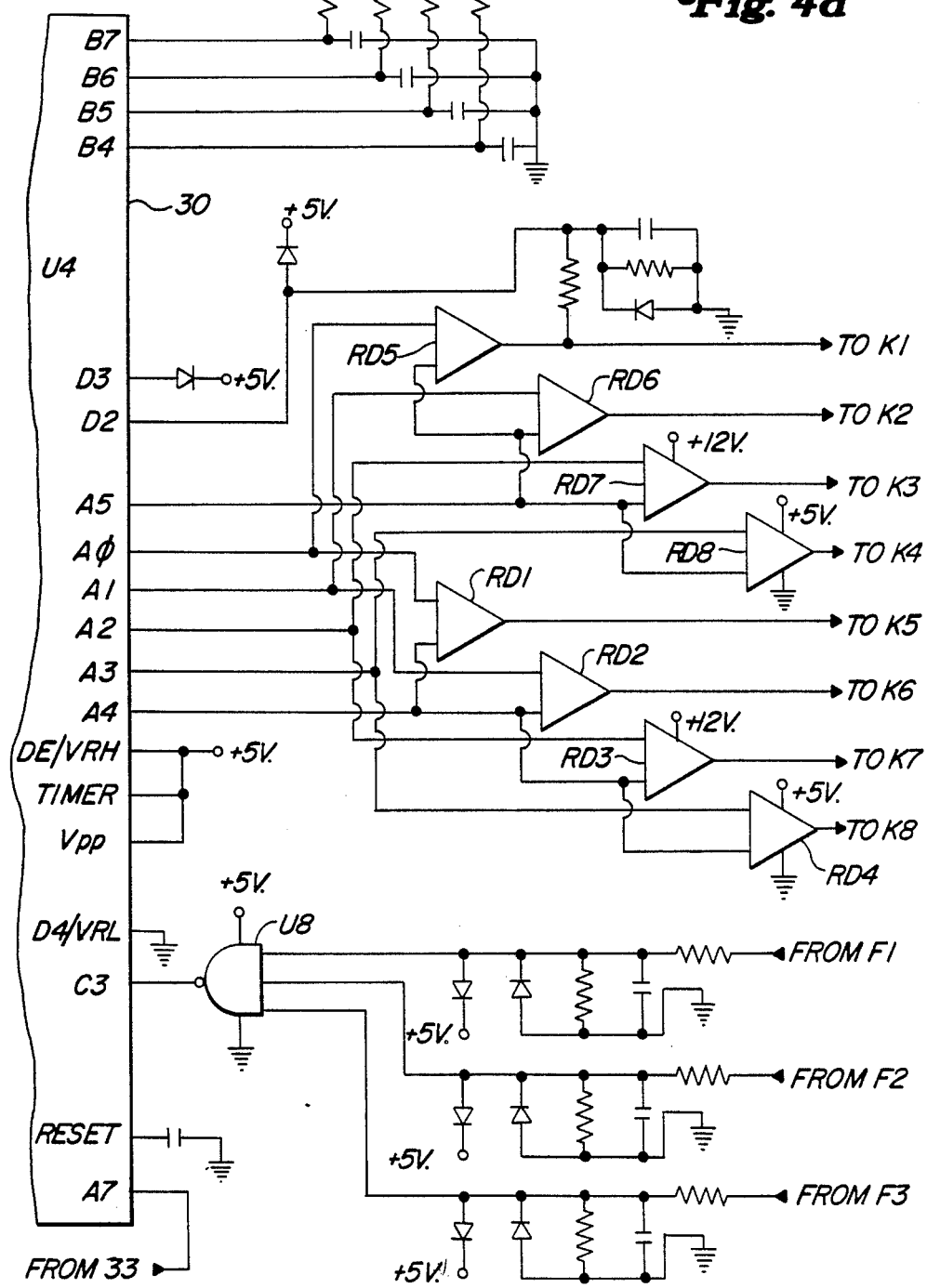
Figure 4E:
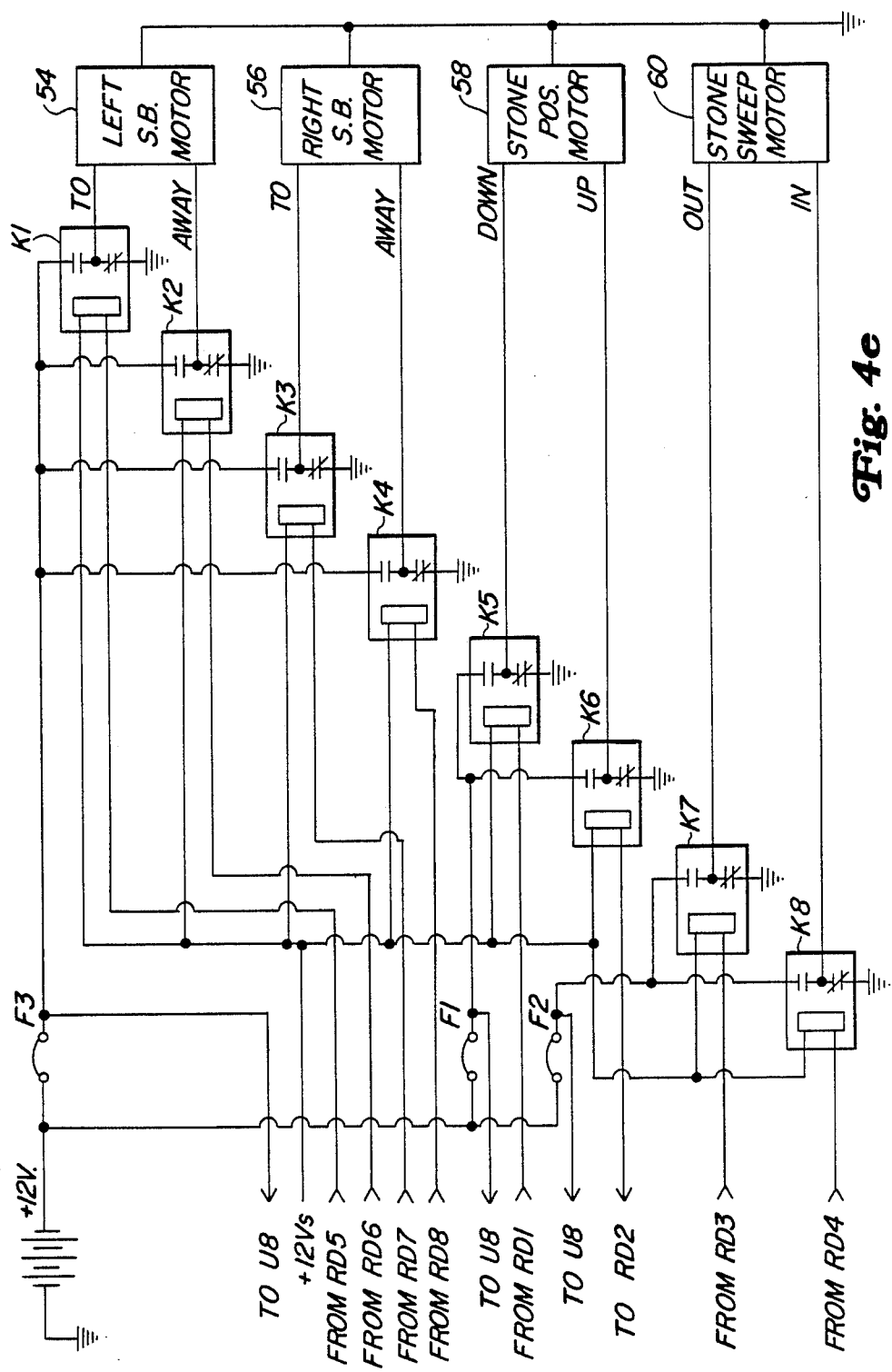
FIG. 4e is a circuit diagram showing the motor relays and the motors of the present invention.

The microprocessor U4 also provides output signals to a left and right shearbar adjusting motor 54, 56, to a stone positioning motor 58 and to a stone sweep motor 60 via relay drivers RD1-RD8, and relays K1-K6. Referring now to FIG. 4b, the shearbar position motors 54, 56 are protected by fuse F3, the stone position motor 58 is protected by fuse F1, and the stone sweep motor 60 is protected by fuse F2. The condition of fuses F1-F3 is sensed by the microprocessor U4 via noise filtering and voltage clamping circuitry and NAND gate U8 (shown in FIG. 4a).

The shearbar adjusting motors 54, 56 are part of left and right shearbar adjusting mechanisms 62, one of which is shown in FIG. 5. The motors 54, 56 are preferably high torque, slow speed gear motors, such as a Model VW62 gear motor manufactured by the von Weise Gear Company. The output shaft of the gearmotor 54, 56 is coupled to a conventional drive socket 64 for driving the knife adjusting bolts 17 19 which are part of the conventional manual shearbar adjusting mechanism. The mechanism 62 includes a bracket 68 which is connected to the housing of gearmotor 54, 56 and to one end of a tube assembly 70. The tube assembly 70 receives the bolt 17, 19 and has a lower bracket 72 which is bolted to the frame (not shown) of the forage harvester at the lower end of bolts 17, 19.

The stone positioning (stone up/stone down) motor 58 is part of a stone positioning mechanism 80 which is shown in FIG. 6. The motor 58 is preferably an in-line gear motor such as a model VW80 sold by von Weise Gear Company. The mechanism 80 includss a coupler 82 which is fixed to the output shaft of gear motor 58 and which engages an end of input shaft 84 of the conventional manually operated stone in/out positioning mechanism. A bracket 86 bolts to a housing of gear motor 58 and to the housing 88 of the conventional stone positioning mechanism. Preferably, the coupler 82 engages the end of shaft 84 which is opposite the end of which the conventional manually operated crank arm is attached. In this manner, the stone 20 can be manually up/down positioned by manually turning shaft 84 if the motor 58 is uncoupled from the opposite end of shaft 84.

The stone sweeping mechanism 90 is shown in FIG. 7 and includes slotted front and rear panels 92, 94 which are fixed to the frame of the forage harvester adjacent to the conventional stone carrier mechanism 24. The panels are bolted together at their ends on opposite sides of cylindrical spacers which rotatably support fixed pulleys 95, 96, 97, 98, 99 and 100. The panels 92, 94 slidably support a movable pulley carrier which includes front and rear members 102, 104 bolted together on opposite sides of spacers 105, 106, 107, 108 and 109. The guides 102, 104 are slidably supported by guide members 101, 103 which are bolted to panels 92, 94 beneath slots 91, 93, respectively. The spacers 105–109 are slidably received in slots 91, 93 in panels 92, 94, respectively. Spacer 107 rotatably supports a pair of pulleys 110, 112. A cable anchor backet 114 is fixed for movement with rear member 104 so that opposite ends of a cable 116 may be anchored to it. The stone sweep motor 60 is a linear stroke actuator such as Part No. 9220-103-008 sold by Warner Electric Co., and has a housing 120 fixed to one end of panel 92 and an actuator piston 112 pinned to a clevis 123 which is bolted to carrier members 102 and 104.

Figure 8:
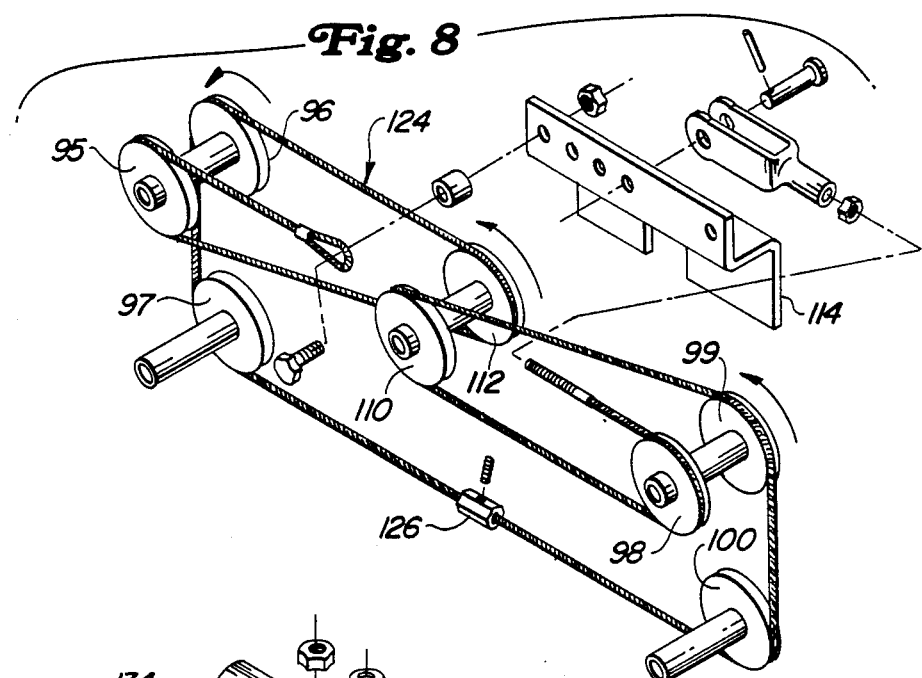
FIG. 8 is a perspective view showing how the cable of the stone sweep assembly is routed around the various pulleys thereof.

As shown in FIG. 8, a cable 124 is threaded around the pulleys 95–100 and 110, 112 and has its end anchored to anchor bracket 114. A clamp 126 is fixed to the lowermost span of cable 124.

Figure 9:
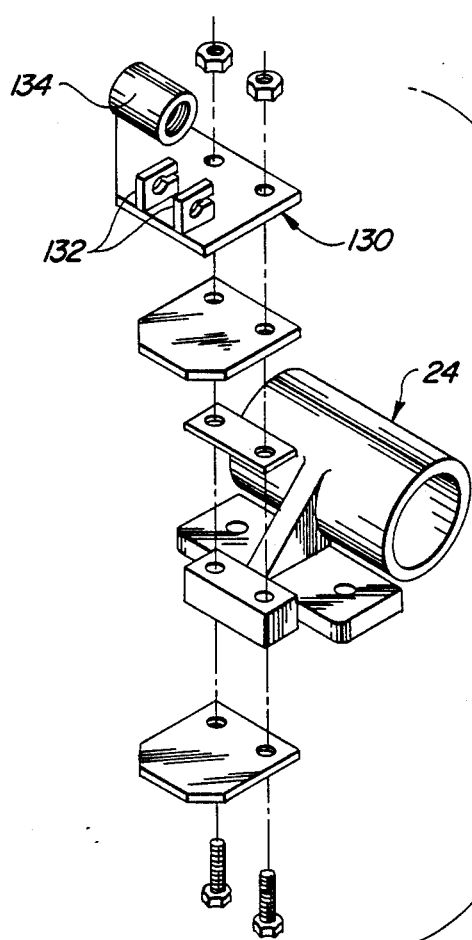
FIG. 9 is a perspective view of a portion of the stone sweep mechanism.

Referring now to FIG. 9, an adapter bracket 130 is bolted to the stone carrier 24. The bracket 130 supports a pair of apertured plates 132 and a threaded sleeve 134. Referring now to FIGS. 8 and 9, the cable clamp 126 is received between plates 132 with their apertures receiving the cable 124 on opposite sides of clamp 126. With the sweeping mechanism 90 of FIG. 7 and with the structure of FIGS. 8 and 9, the limited stroke of stone sweep motor 60 will cause the stone carrier 24 to sweep across the full width of the cutterhead 12. A conventional manual stone sweeping rod (not shown) may be threaded into sleeve 134 so that the stone 20 can be manually swept back and forth by merely disconnecting actuator piston 122 from clevis 123.

The stone sweep in limit switch 42 and the sweep out limit switch 44 may be mounted on a frame or cover part (not shown) of the forage harvester in a location so as to be engaged by member 104 or anchor bracket 114 of the pulley carrier when the pulley carrier is at the extreme ends of allowed lateral motion. The stone up limit switch is preferably mounted on a frame or cover part (not shown) so as to engage the stone carrier 24 when the stone carrier 24 is moved outwardly and away from the cutterhead 12 as far as possible.

The microprocessor U4 is programmed to execute an algorithm or computer program described by the computer program listing set forth in the microfiche appendix. The operation of this algorithm will now be described with reference to the logic flow diagrams set forth in FIGS. 10 through 19.

Figure 10A:
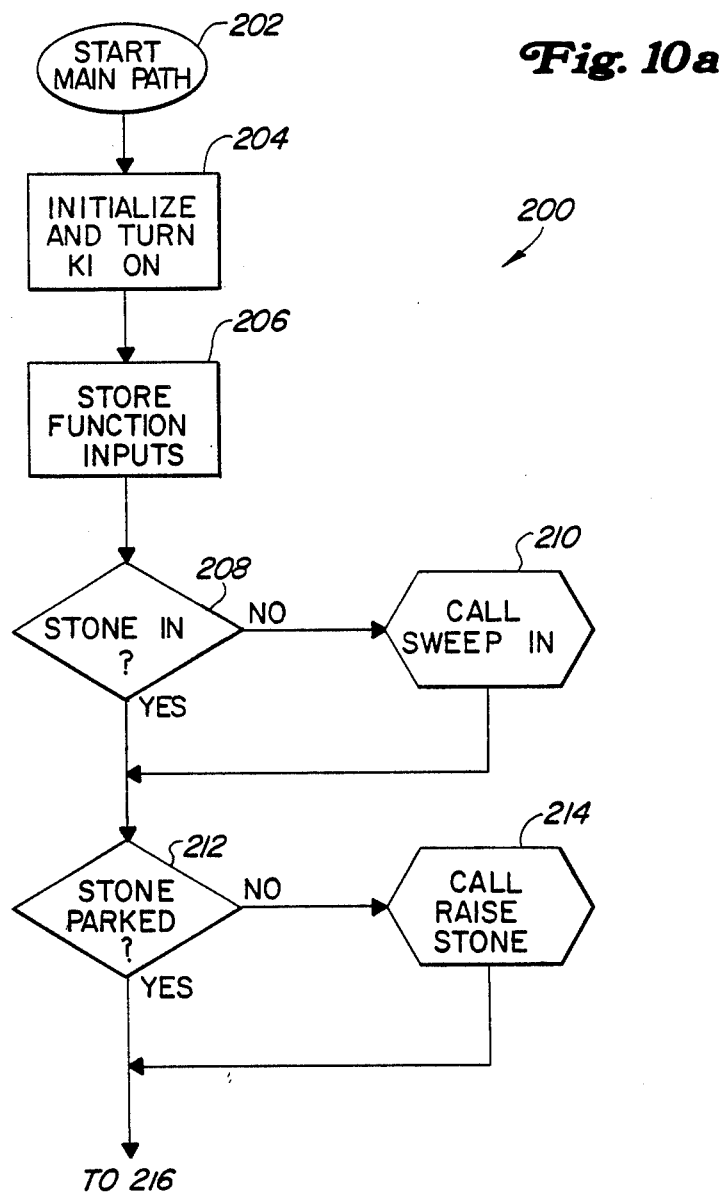
FIGS. 10a-10c are logic flow diagrams of a MAIN PATH algorithm executed by the control unit of the present invention.
Figure 10B:
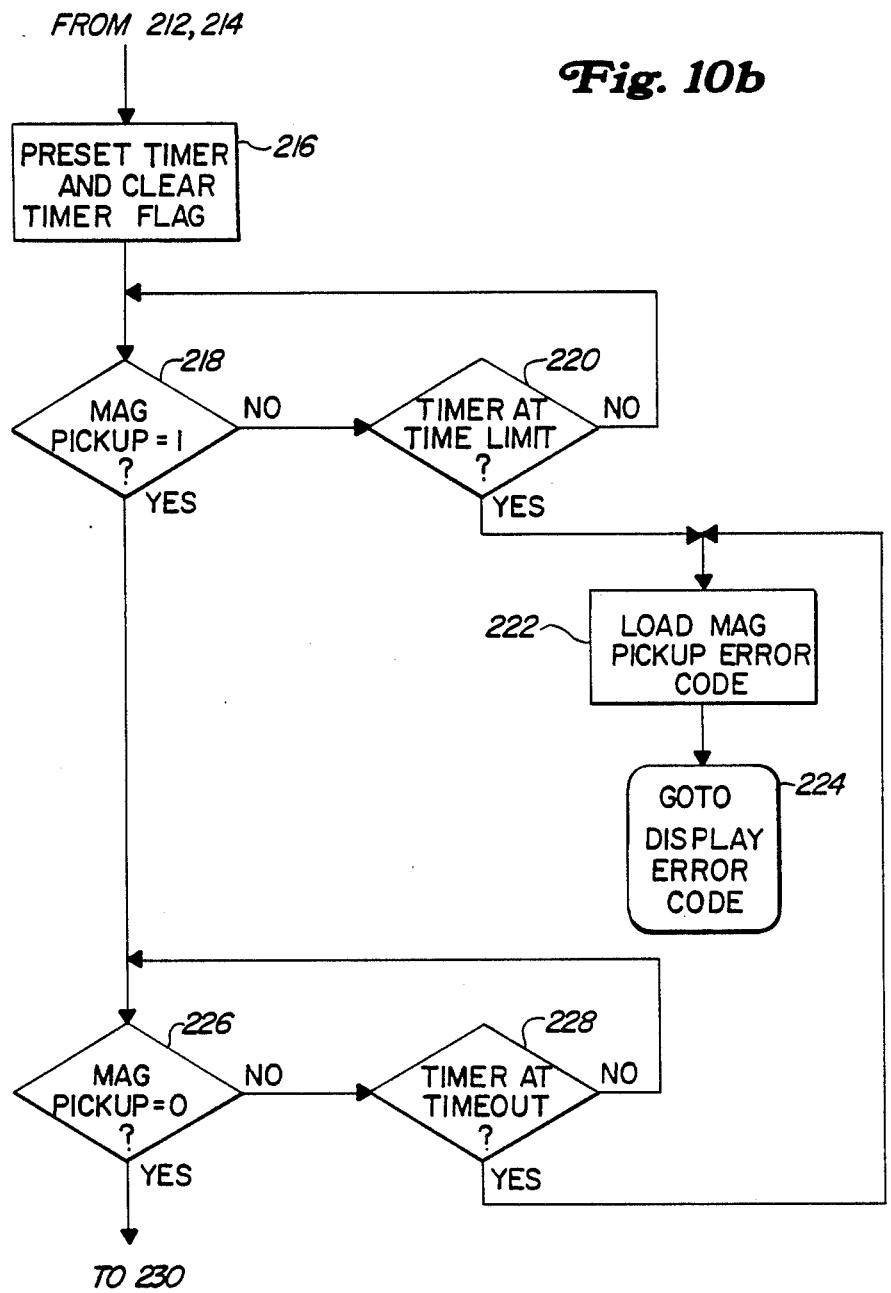
Figure 10C:
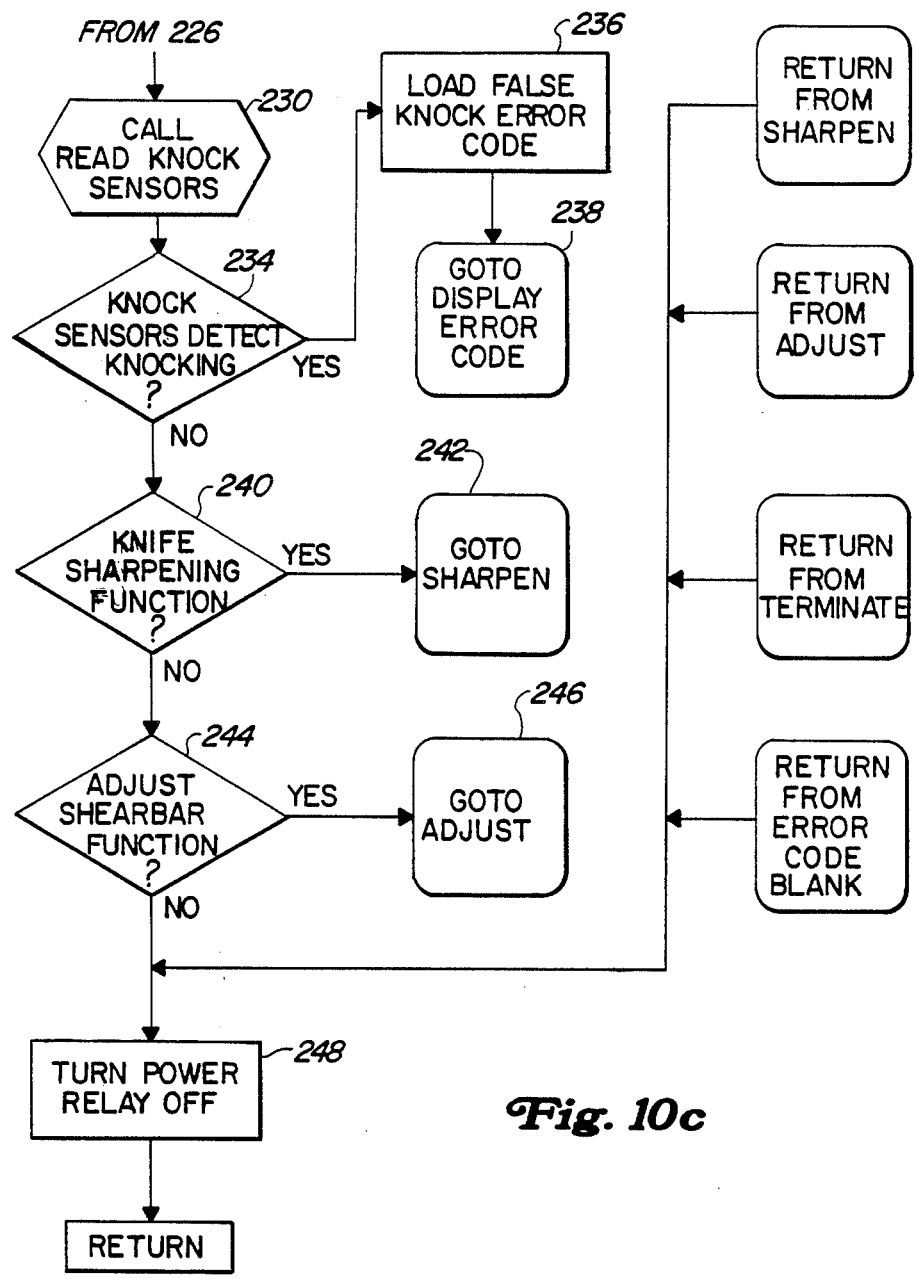

Referring now to FIGS. 10a, 10b and 10c, the microprocessor U4 executes a MAIN PATH algorithm 200, which is entered at step 202. Then step 204 operates to initialize (clears all flags to 0) and turns on power relay K0 (see FIG. 4a). Then, step 206 stores in a memory location the status of switches 46 and 48 and of potentimeter 50.

Step 208 determines if the sharpening stone is at its home or "in" position which is defined as the position of stone 20 when stone sweep motor 60 is fully retracted and limit switch 42 is toggled. If not, step 210 directs the algorithm to a stone SWEEP IN subroutine described hereinafter with reference to FIG. 11.

Then, step 212 determines if the stone is in its "parked" (fully up) position (limit switch 40 toggled). If not, step 214 calls a RAISE STONE subroutine (see FIG. 12). Otherwise, the algorithm proceeds to step 216 which presets a software timer (Timer 1) to time out in approximately 1 second and clears a timer flag.

Step 218 through 224 function to generator an error code if the signal from the mag pickup 32 does not obtain a logic 1 value within a 1 second time interval. Steps 226, 228, 222, and 224 operate to generate an error code if the signal from the mag pickup 32 does not attain a logic 0 value within a 1 second time interval. If the mag pickup signal is not toggling, then it means that either the cutterhead is not rotating or that there is some electrical problem. Step 230 calls the READ KNOCK SENSOR subroutine described hereinafter with reference to FIGS. 3a–13d. Step 234 determines whether or not the knock sensors are detecting a knocking noise. If so, then steps 236 and 238 display an error signal which indicates that loose hardware on the machine is vibrating since the sharpening stone has been pulled away from the cutterhead 12 by reason of steps 212 and 214.

If the knock sensors are not detecting a knocking sound, then the algorithm proceeds to step 240 which determines whether or not the operator has selected the knife sharpening function by momentarily depressing switch 48. If so, then step 242 directs the algorithm to a KNIFE SHARPEN subroutine described hereinafter with reference to FIGS. 14a–14e. Then step 244 determines whether the operator has selected the shearbar adjust function by closing switch 46. If so, step 246 directs the algorithm to a SHEARBAR ADJUST subroutine described hereinafter with reference to FIGS. 19a–19e. The algorithm then proceeds to step 248 which turns power relay K0 off and then returns to step 202.

Figure 11:
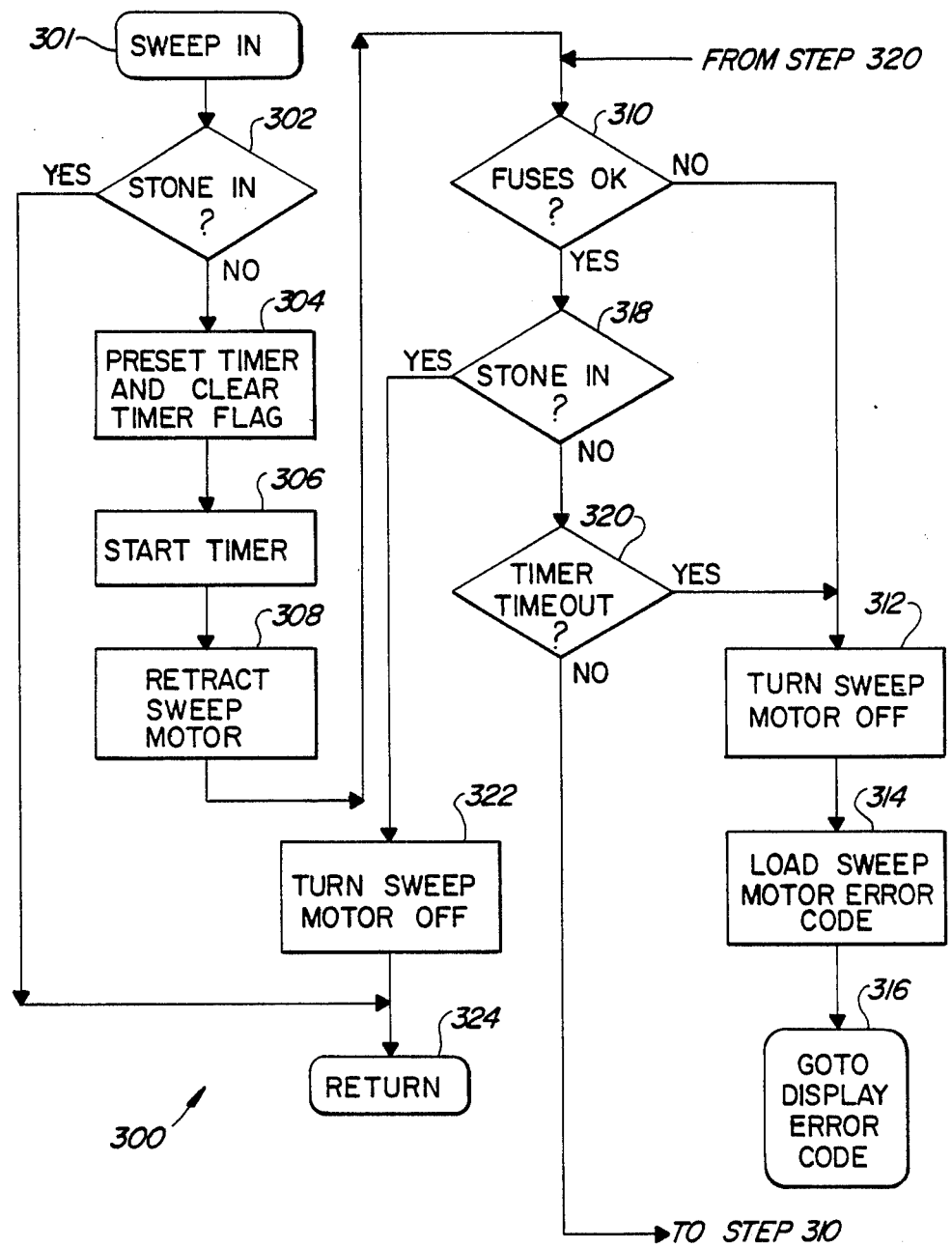
FIG. 11 is a logic flow diagram of a SWEEP-IN subroutine executed by the control unit.

Referring now to FIG. 11, the SWEEP IN subroutine is entered at step 301. Then, step 302 determines whether or not switch 42 is toggled to indicate that the stone sweep motor 60 is fully retracted. If yes, then the algorithm proceeds to step 324 and then returns to the MAIN PATH algorithm. If the stone sweep motor 60 is not fully retracted, then the algorithm proceeds to step 304 which presets a timer to a value corresponding to a time period such as 15 seconds and clears a timer flag. Then in step 306, the 15 second timer is enabled or started. In step 308, relay K4 (shown in FIG. 4e) is energized to cause the sweep motor 60 to retract.

Step 310 then checks the condition of the motor fuses F1, F2 and F3. If any of these fuses is out, then the algorithm proceeds to step 312 which turns the sweep motor 60 off, then, to step 314, which generates a sweep motor error code which is displayed as a result of step 316. If, in step 310, the fuses are intact, then the algorithm proceeds to step 318 which again determines if the stone is at the end limit position. If not, then the algorithm proceeds to step 320 which determines whether or not the 15 second timer has timed out. If the 15 second timer has timed out, then the algorithm proceeds again to steps 312, 314 and 316, as described previously. If the 15 second timer has not timed out, then the algorithm branches back to step 310 previously described. If, in step 318, the stone is at the end limit position, then the algorithm proceeds to step 322 which turns the sweep motor 60 off and then to step 324 which returns to the MAIN PATH algorithm.

Figure 12:
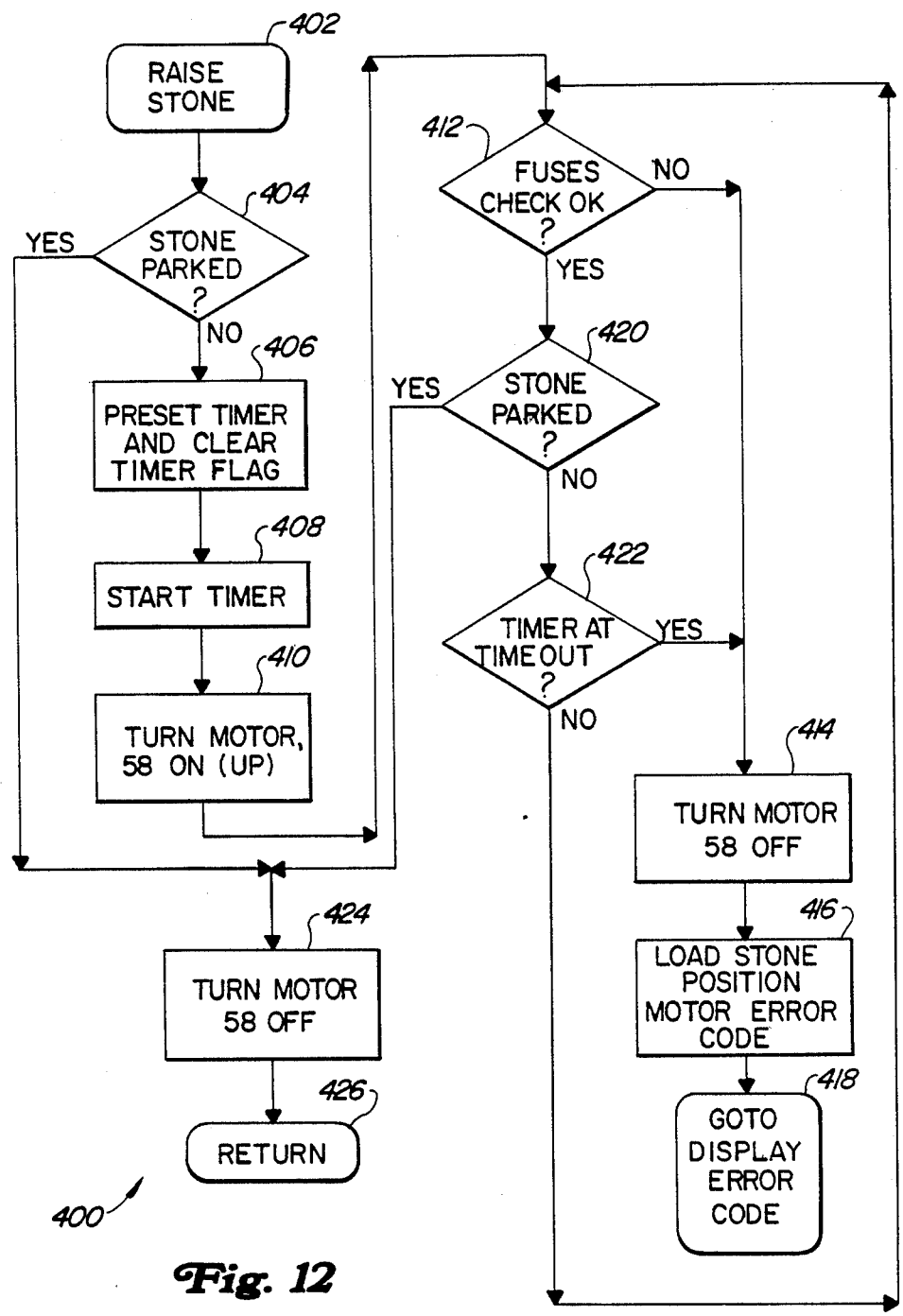
FIG. 12 is a logic flow diagram of a RAISE STONE subroutine.
Figure 13A:
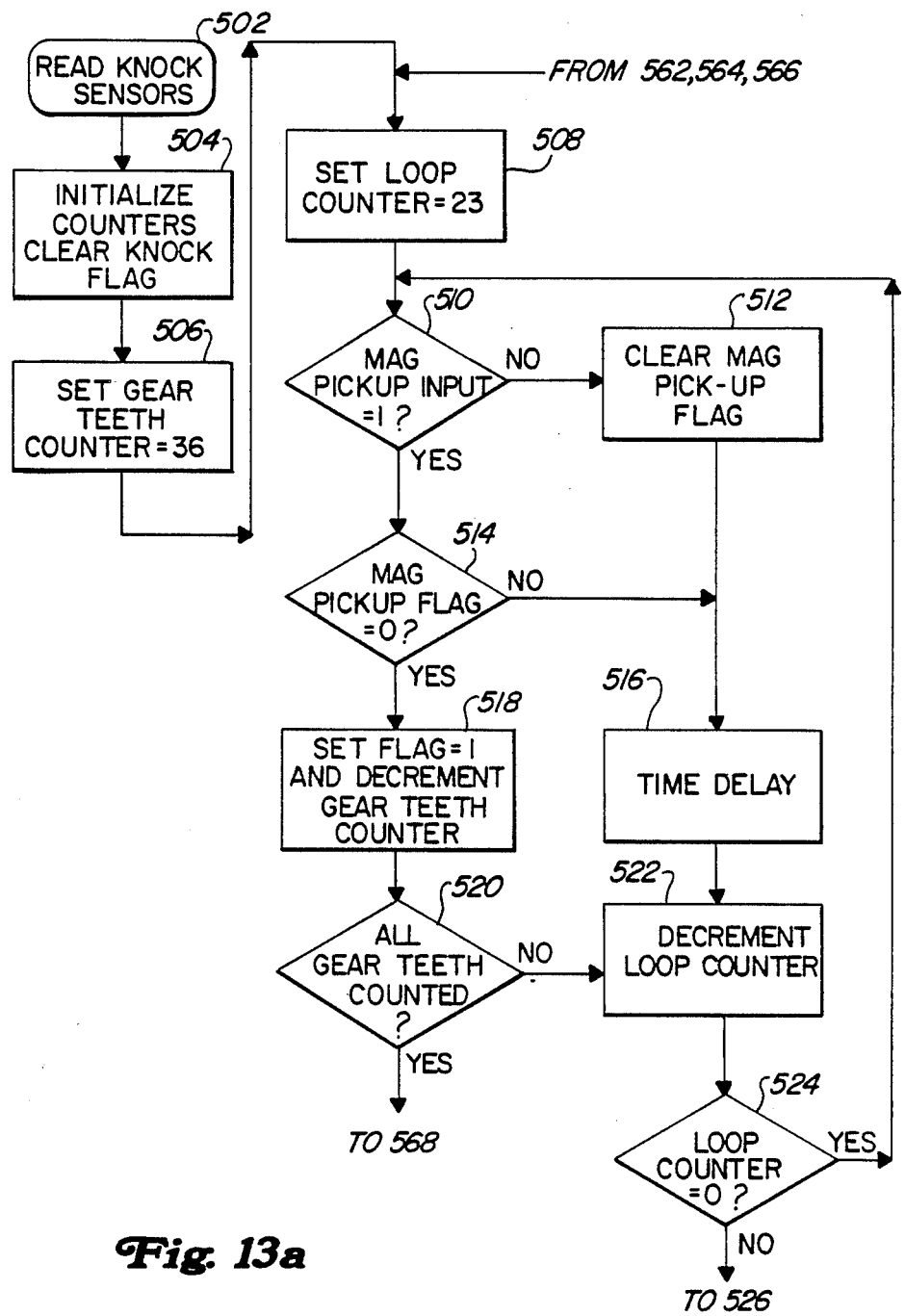
FIGS. 13a-13d are logic flow diagrams of a READ KNOCK SENSOR subroutine.
Figure 13B:
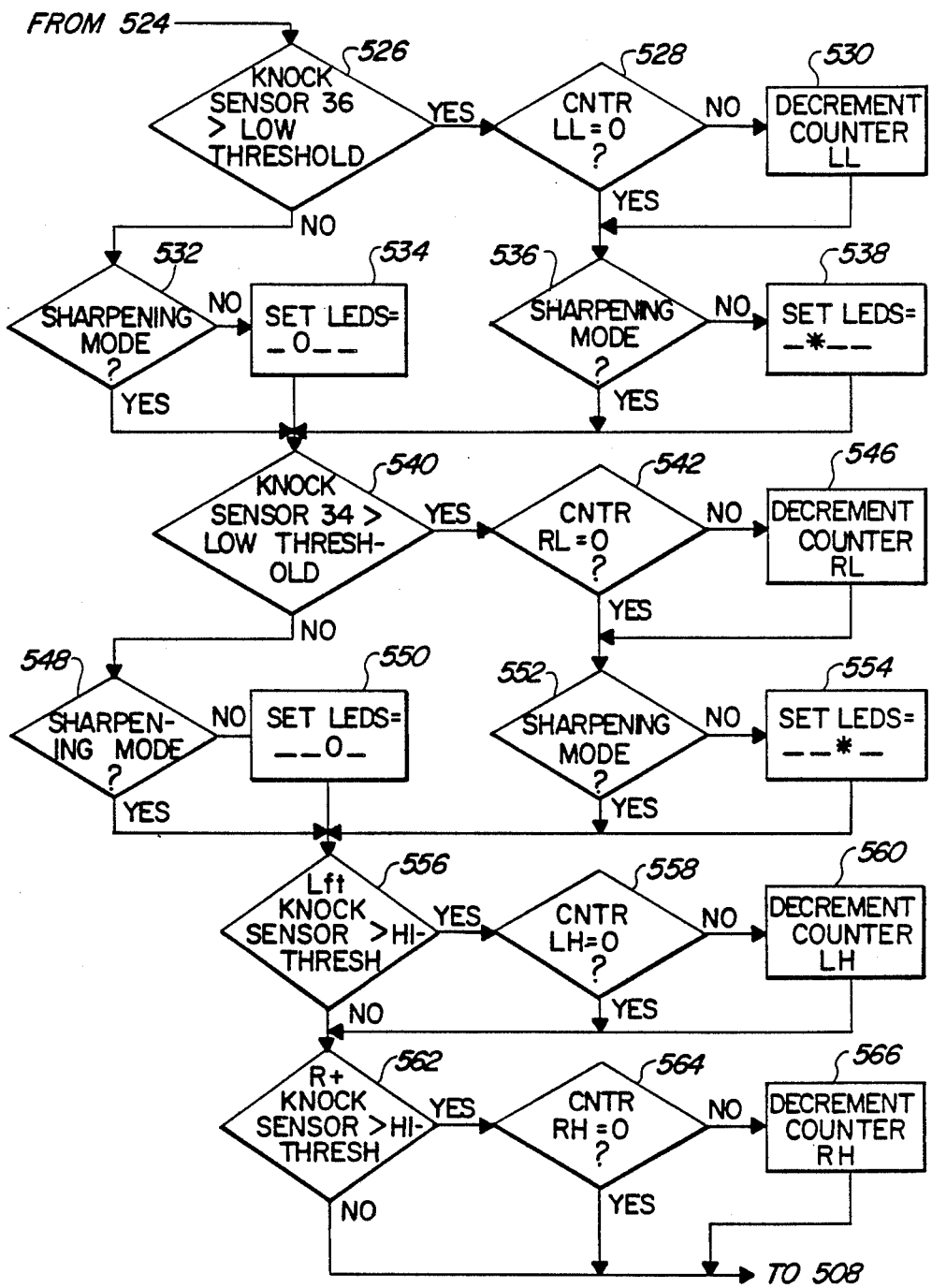
Figure 13C:
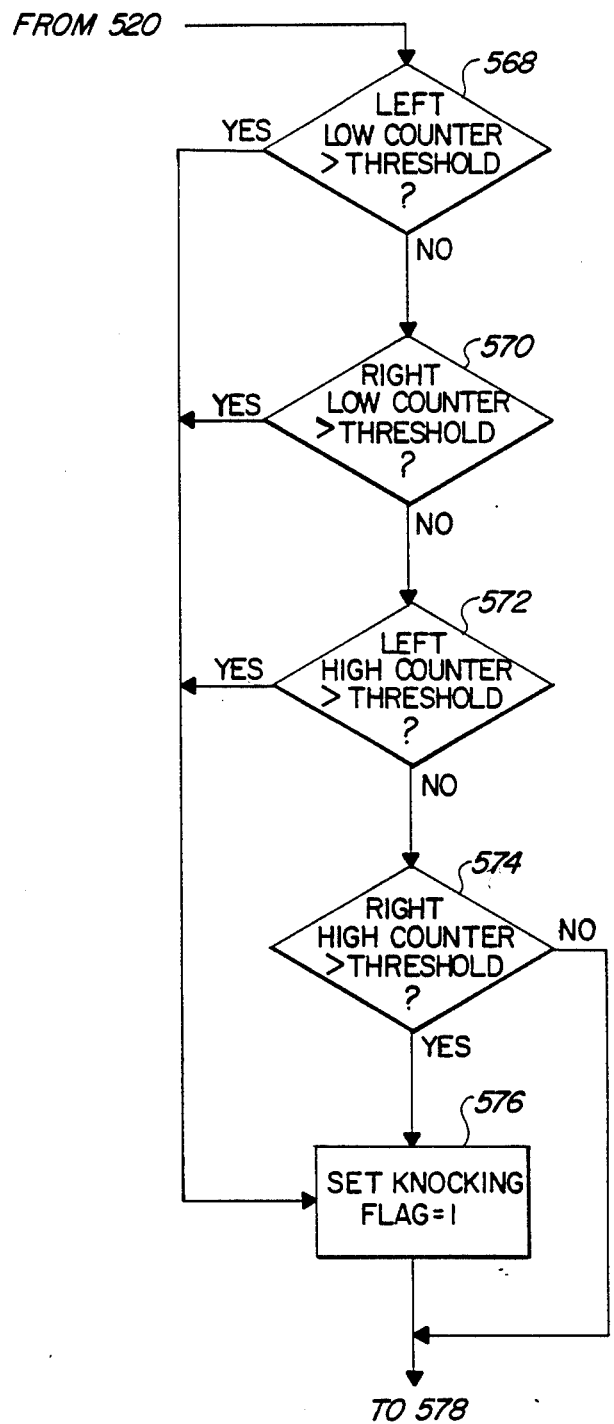
Figure 13D:
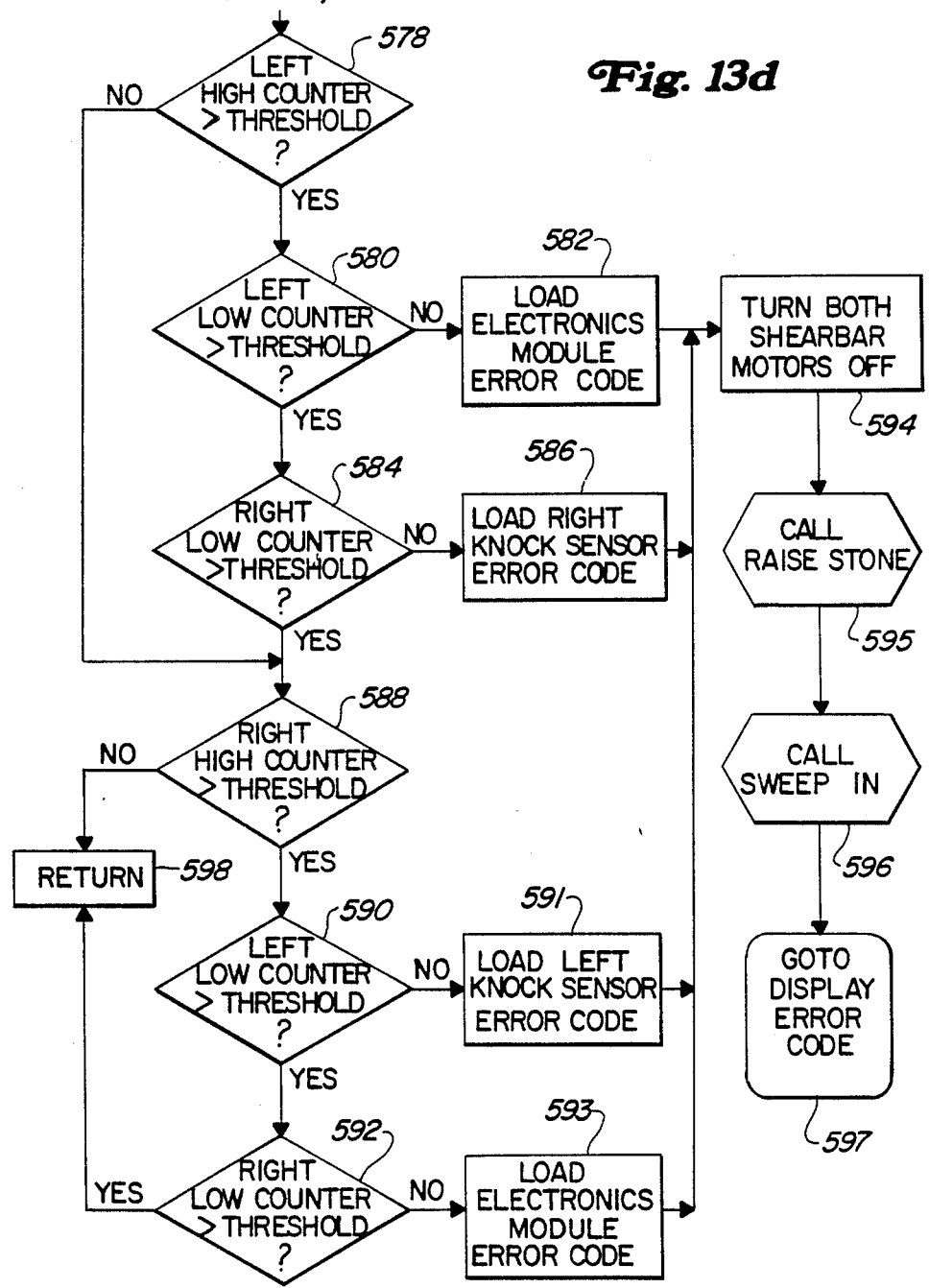

Referring now to FIG. 12, the RAISE STONE subroutine 400 is entered at step 402. Then, step 404 determines whether the stone 20 is in its park position by examining the status of switch 40. If the stone 20 has been fully raised, then the algorithm jumps ahead to step 424 which turns the stone position motor 58 off and then to step 426 which returns to the MAIN PATH algorithm.

If the sharpening stone 20 is not already fully raised to its park position, then the algorithm proceeds from step 404 to step 406 which presets a timer to a value corresponding to approximately 1½ minutes and clears a timer flag. Then, step 410 energizes relay K6 and turns to stone position motor 58 on to move the stone in the up direction away from the cutterhead 12.

The algorithm then proceeds to step 412 which checks the condition of the motor protection fuses. If the condition of the fuses is not normal, then the subroutine proceeds to step 414 which turns the stone position motor 58 off and then to step 416 and 418 which cause an error message to be displayed. If, in step 412, the motor protection fuses check out okay, then the subroutine proceeds to step 420 which again determines whether or not the stone 20 is at the fully raised park position. If not, the subroutine proceeds to step 422 which determines whether or not the 1.5 minute timer has timed out. If the timer has timed out, the subroutine proceeds again to steps 414, 416 and 418 as previously described. If the timer has not timed out, the subroutine loops back to step 412 as previously described. If, on the other hand, in step 420, the stone 20 has been raised to the park position, then step 420 directs the subroutine to step 424 which again turns the motor 58 off and then to step 426 which returns the subroutine to the MAIN PATH algorithm.

Referring now to FIGS. 13a–13d, the READ KNOCK SENSOR subroutine 500 is entered at 502, then step 504 initializes four 8-bit software counters (left low (LL), left high (LH), right low (RL) and right high (RH)), to 256 and clears a knock sensor flag (FLAG 1). Then, step 506 loads a gear teeth counter with the number of gear teeth (36, for example) which would be sensed by mag pickup 32 during 2 revolutions of the cutterhead 12. Next, step 508 loads a number such as 23 into a loop counter to adjust the subroutine timing so that the knock sensors 34 and 36 will be read at a desired repetition rate, such as every 1 milisecond, for example.

Steps 510–524 form a loop which examines the output of the mag pickup 32 in steps 510 and 514, clears a mag pickup flag in step 512 if the output is high, and sets the mag pickup flag in step 518 to 1 if the output is low. If the gear teeth counter has counted down to zero (meaning the cutterhead has made 2 revolutions), then step 520 exits from this loop to step 568 described hereinafter. Otherwise, this loop continues to repetitively read the knock sensors until the loop counter (decremented at step 522) equals zero, whereupon step 524 directs the subroutine to a portion of the subroutine comprising steps 524–538.

Steps 524–538 operate to cause one of the LED indicators 52 to blink, if the signal from the left knock sensor 36 exceeds a low threshold (1 volt for example) when the operator has not selected the auto knife sharpening mode. Steps 540–554 cause another one of LED indicators 52 to blink if the signal from the right knock sensor 34 exceeds the low threshold, when the operator has not selected the auto knife sharpening mode.

Steps 556–560 decrements the left high knock sensor counter (LH) whenever the signal from the left knock sensor 36 exceeds a high threshold (2 volts for example). Steps 562–566 decrements the right high knock sensor counter (RH) whenever the signal from knock sensor 34 exceeds the high threshold. The counters LL, LH, RL and RH thus keep track of the proportion of time that the signals from knock sensors 34 and 36 exceed the separate low and high threshold levels. The subroutine then loops back to step 508 and continues to repeat steps 508–566 until step 520 determines that the cutterhead 12 has completed 2 revolutions, whereupon the subroutine proceeds to step 568.

Steps 568–574 determine if any of the counters LL, LH, RL or RH have been decremented down to a value such as 225 (indicating that at least one of the knock sensors has detected knocking for at least a certain portion of the time required for the cutterhead to make 2 revolutions). If so, step 576 sets the knocking flag to logic 1 to indicate that the knock sensors 34 and 36 are detecting knocking and directs the subroutine to step 578. If not, the knocking flag remains cleared (as a result of step 504), as the subroutine proceeds to step 578.

Steps 578–586 operate to generate and display an error message if the counter value for the left knock sensor 36 exceeds the high threshold while the low threshold is not exceeded by the counter values for either the left or right knock sensors 36, 34. Steps 588–593 operate to generate and display an error message if the counter value for right knock sensor 34 exceeds the high threshold while the low threshold is not exceeded by the counter value for either the left or right knock sensors. After generation of the error codes in steps 582, 586, 591 or 593, the subroutine proceeds to step 594 which turns off both shearbar motors 54 and 56, then to step 595 which calls the RAISE STONE subroutine (FIG. 12), then to step 596 which calls the SWEEP IN subroutine (FIG. 11), then to step 597 which causes the particular generated error code to be displayed. If no error codes are generated, then the subroutine proceeds to step 598 which returns to the place from which the READ KNOCK SENSOR subroutine was entered.

Figure 14A:
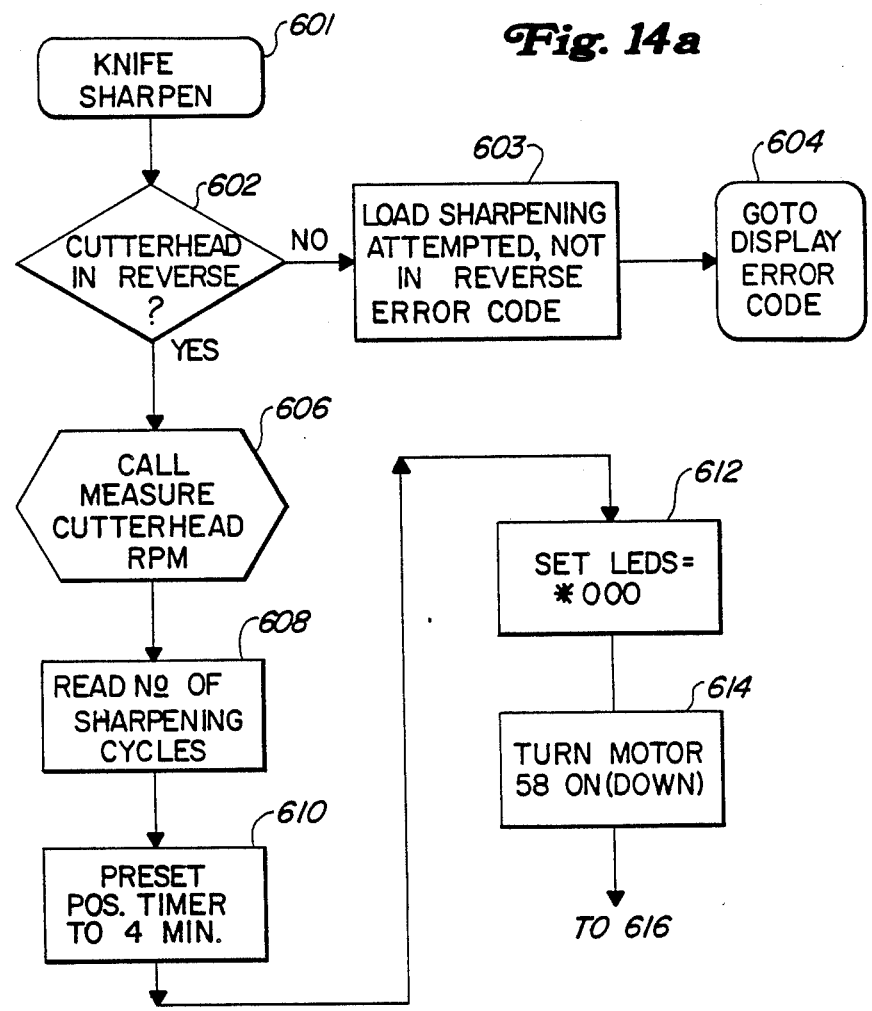
FIGS. 14a-14e are logic flow diagrams of a KNIFE SHAPREN subroutine.
Figure 14B:
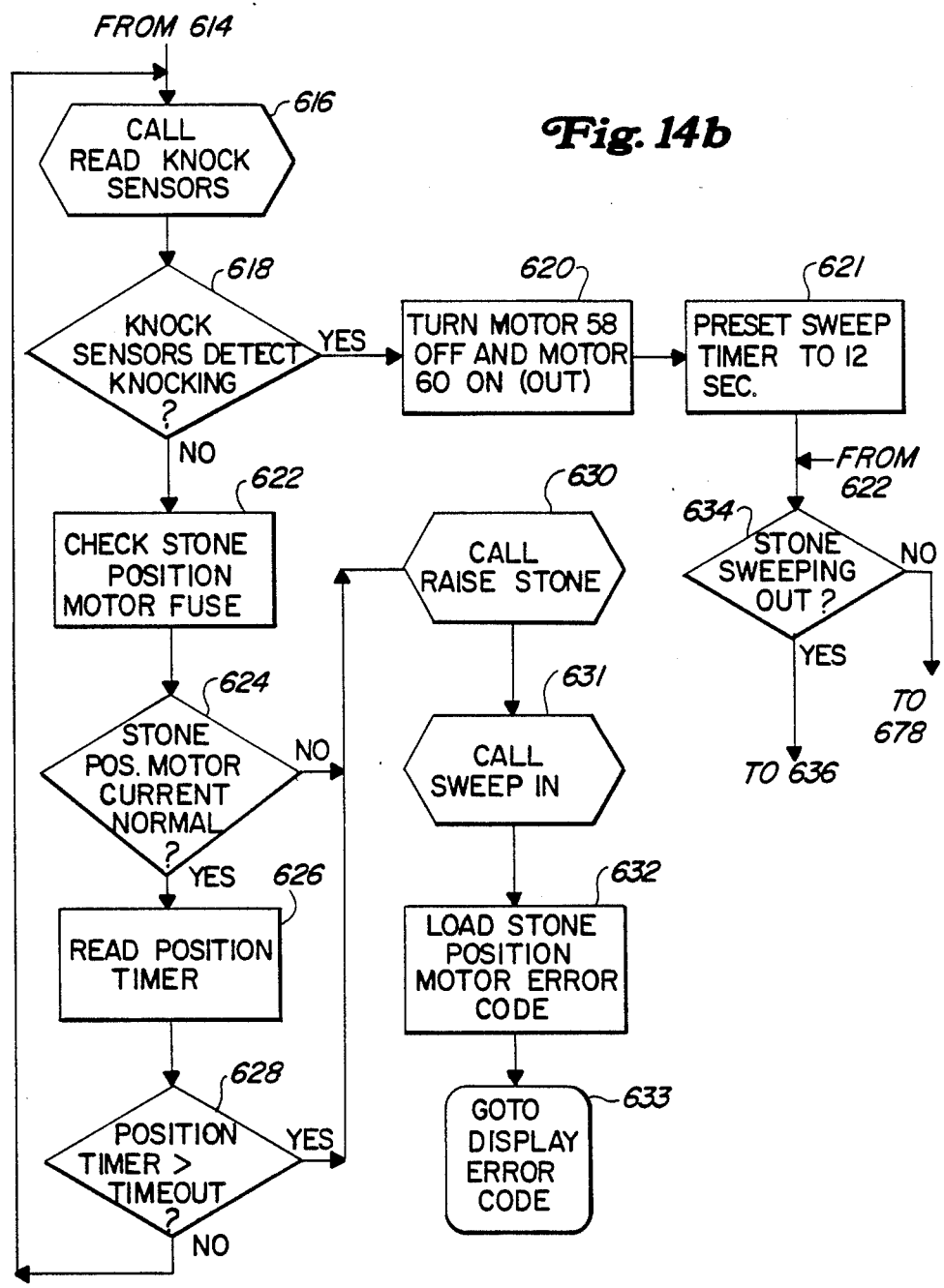
Figure 14C:
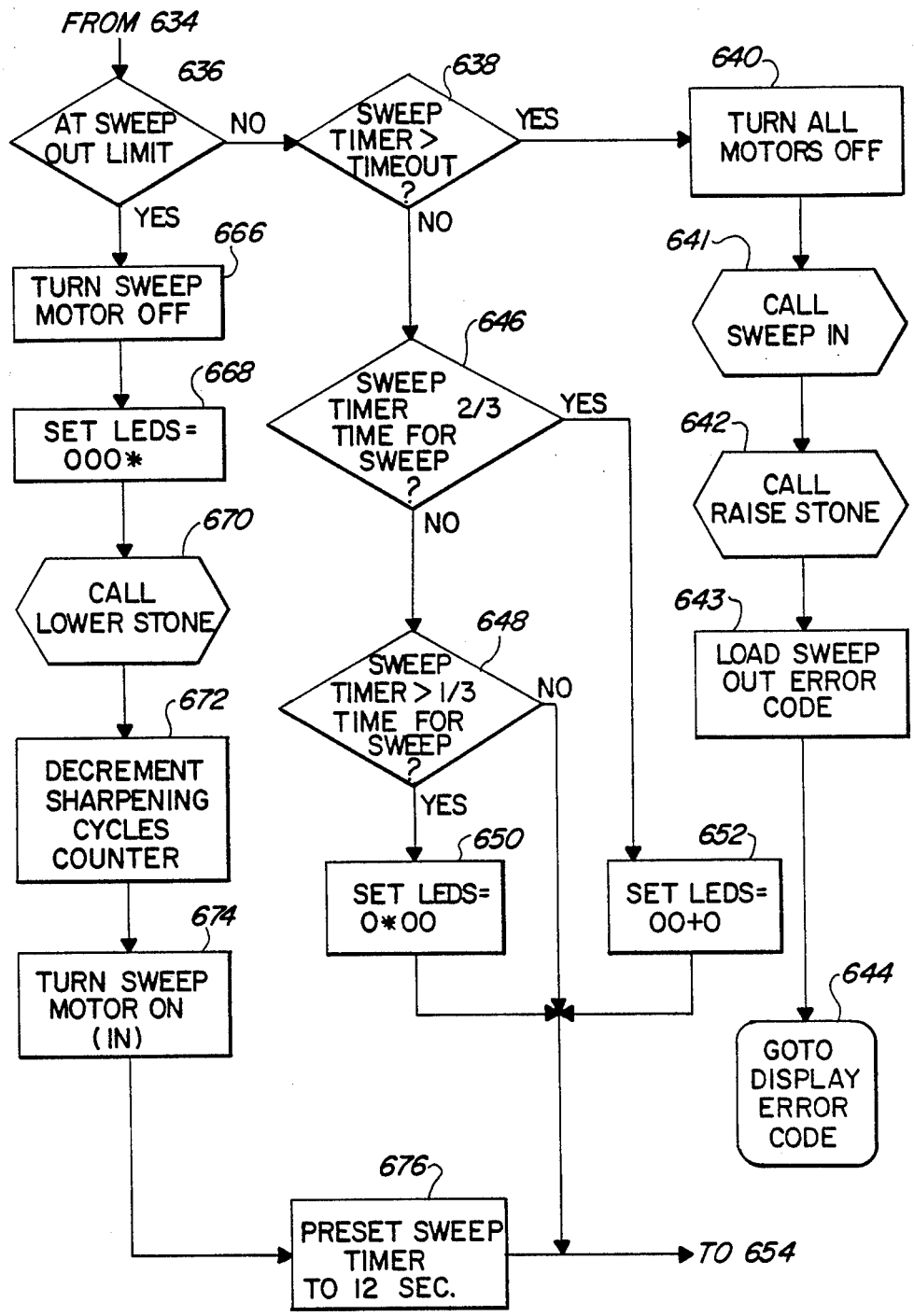

Referring now to FIGS. 14a and 14b, the KNIFE SHARPEN subroutine is entered at step 601. Then, at step 602, the algorithm determines whether the cutterhead is rotating in the reverse direction. If not, then steps 603 and 604 prevent automatic knife sharpening and cause an error message to be generated and displayed. If the cutterhead is rotating in the reverse direction, then it is appropriate for knife sharpening to take place and the algorithm proceeds to step 606 which calls a cutterhead speed measurement (CUTTERHEAD RPM) subroutine which will be described later with reference to FIG. 16. The algorithm then proceeds to step 608 which reads the number of sharpening cycles set by the operator by adjustment of potentiometer 50. By adjustment of potentiometer 50, the operator can select from 0 to 32 sharpening cycles. Then, in step 610, a position timer is preset to four minutes. It should be noted that the position timer and the other timers referred to in this system are software timers which are decremented periodically by an interrupt technique which is not shown in the logic flow diagrams, but which is well known to those skilled in the microprocessor art. The algorithm then proceeds to step 612 which energizes one of the four LEDs 52 to indicate that the stone sweep motor 60 is fully retracted. The algorithm then proceeds to step 614 which causes stone position motor 58 to lower the sharpening stone 20 towards the cutterhead knives.

Next, step 616 calls the READ KNOCK SENSOR subroutine which has been previously described with respect to FIGS. 13a-13d. Then, step 618 determines whether the knock sensors have detected knocking. If no knocking is detected (indicated by knocking flag=-1 in step 576), the algorithm proceeds to step 622 which checks the condition of the stone position motor fuse. If the fuse current is not normal, then step 624 directs the algorithm to step 630-633 which calls the RAISE STONE subroutine, calls the SWEEP IN subroutine, and which causes a stone position motor error message to be displayed. If the stone position motor current is normal, then step 624 directs the algorithm to step 626 which reads the position timer and then to step 628 which again directs the algorithm to step 630 to 633 if the position timer has timed out. If, in step 628, the position timer has not timed out, then the algorithm is directed back to step 616 once again.

If, in step 618, it is determined that the knock sensors are detecting knocking, then this is interpreted to mean that the sharpening stone has contacted the cutterhead knives and the algorithm proceeds to step 620 which turns the stone position motor 58 off and turns the sweep motor 60 on to begin sweeping the stone across the cutterhead. From step 620, the algorithm proceeds to step 621 which presets a sweep timer to a 12 second value which corresponds to the maximum time expected to be required for a full lateral sweep of the sharpening stone. The algorithm then proceeds to step 634 which determines whether or not the stone is being swept out or not. If the stone is being swept out, the algorithm proceeds to step 636 shown in FIG. 14c; otherwise, the algorithm proceeds to step 678 shown in FIG. 14d.

With the sharpening stone being swept in the out direction, the algorithm proceeds to step 636 which determines whether or not the "out" limit has been reached by examining the status of limit switch 44. If the "out" limit has not been reached, then the algorithm proceeds to step 638 which determines whether or not the sweep timer has timed out. If the sweep timer has not timed out, then the stone will continue to sweep in the "out" direction and the algorithm proceeds to steps 646-652 which operate to sequentially light the appropriate LEDs 52 to provide a visual indication of the motion of the stone. After the appropriate LED is lit, the algorithm will proceed to step 654 as described with respect to FIG. 14e.

If, on the other hand, the sweep timer has timed out, then it means more than 12 seconds have elapsed during the time the stone is being swept out and in this case, step 638 directs the algorithm over to step 640 which turns off all motors 54, 56, 58 and 60. Then, step 641 through 644 call the SWEEP IN subroutine, call the RAISE STONE subroutine and cause a sweep out error message to be displayed.

Referring back to step 636 once again, if the sweep out limit has been obtained, then it means that the stone has been swept out to its maximum extent and that switch 44 has been toggled. In this case, step 636 directs the algorithm to step 666 which turns the sweep motor 60 off. Then the algorithm proceeds to step 668 which lights an appropriate one of LEDs 52 to provide a visual indication that the stone has been swept to the "out" position. The algorithm then proceeds to step 670 which calls the LOWER STONE subroutine which will be described later with respect to FIG. 15. Briefly, the LOWER STONE subroutine causes the stone positioning motor 58 to lower the sharpening stone 20 for a duration (and therefore a distance) which depends upon how many sharpening cycles have been executed. After the stone has been lowered by the LOWER STONE subroutine, then the algorithm proceeds to step 672 which decrements the sharpening cycle counter. The algorithm then proceeds to step 674 which causes the stone sweep motor 60 to sweep the sharpening stone back in the "in" direction. Then, step 676 presets the sweep timer again to the 12 second value and finally, the algorithm proceeds to step 654.

Figure 14D:
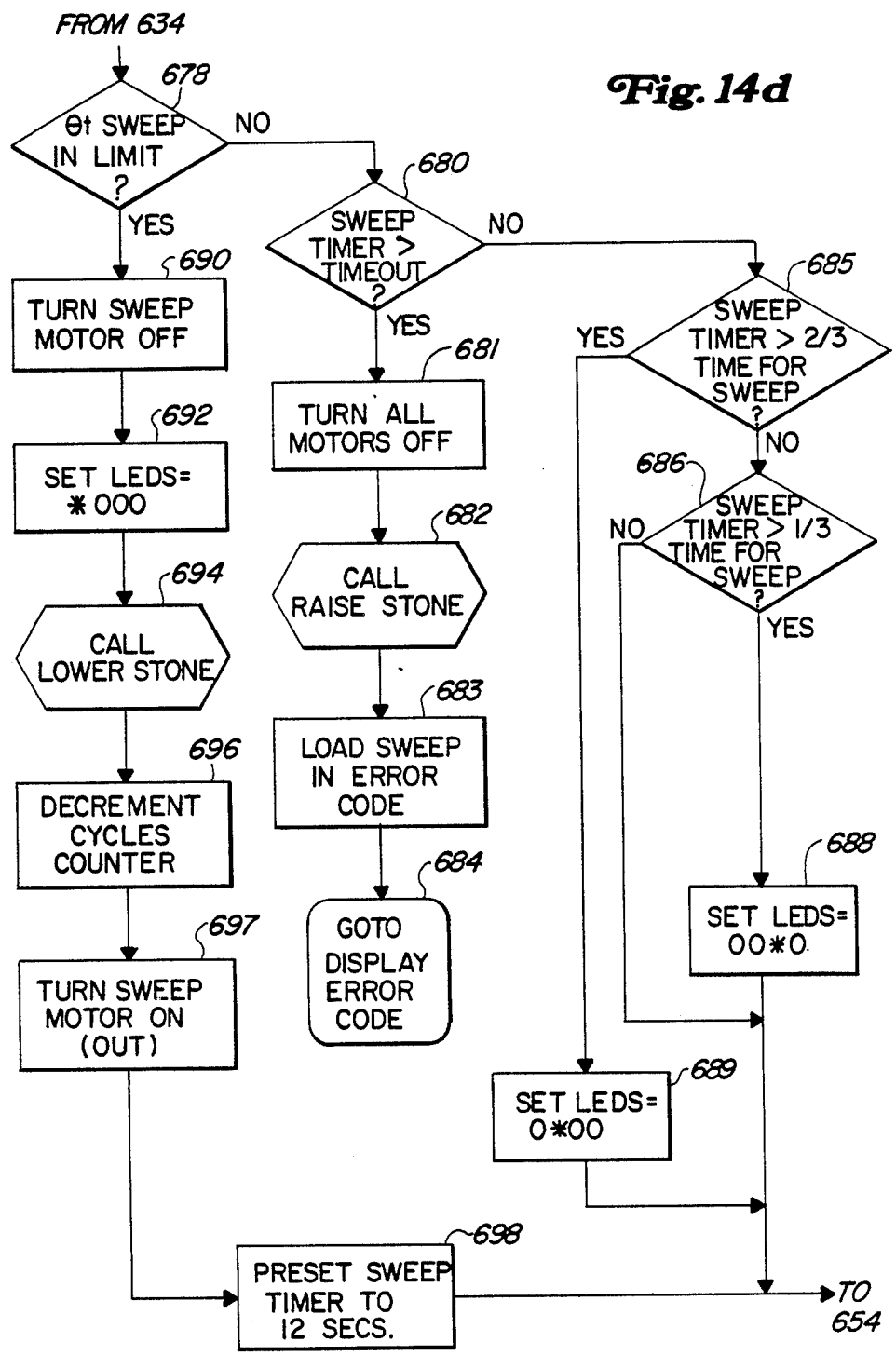

Referring now to FIG. 14d, if the sharpening stone 20 is not being swept in the "out" direction, then the algorithm will be directed to step 678 from step 634. Step 678 determines whether or not the stone is at the "in" position by examining the condition of limit switch 42. If the stone is not at the "in" limit position, then the algorithm is directed to step 680 which determines whether or not the sweep timer has timed out. If the sweep timer has not timed out, the algorithm proceeds to steps 685-689 which energize appropriate ones of the LEDs 52 to indicate the progress of the sharpening stone as it is swept in, whereupon, the algorithm proceeds to step 654 as the stone continues to sweep in.

If, on the other hand, step 680 determines that the sweep timer has timed out, meaning that more than 12 seconds has elapsed since the stone has begun to sweep in, then step 680 directs the algorithm to step 681 which turns all the motors off and then to steps 682 which calls the RAISE STONE subroutine and then to steps 683 and 684 which cause a sweep in error message to be displayed.

Referring once again to step 678, if the sweep "in" limit has been reached, then step 678 directs the algorithm to step 690 which turns the sweep motor 60 off. Then, step 692 lights an appropriate LED to indicate that the stone has been fully swept in. Then, step 694 calls the LOWER STONE subroutine which causes the stone to once again be lowered for a certain distance or duration. Then, the algorithm proceeds to step 696 which decrements the sharpening cycle counter. Then, step 697 turns the sweep motor 60 on to sweep the stone back out and then step 698 again presets the sweep timer to the 12 second value after which the algorithm again proceeds to step 654 as the stone is swept back out.

Figure 14E:
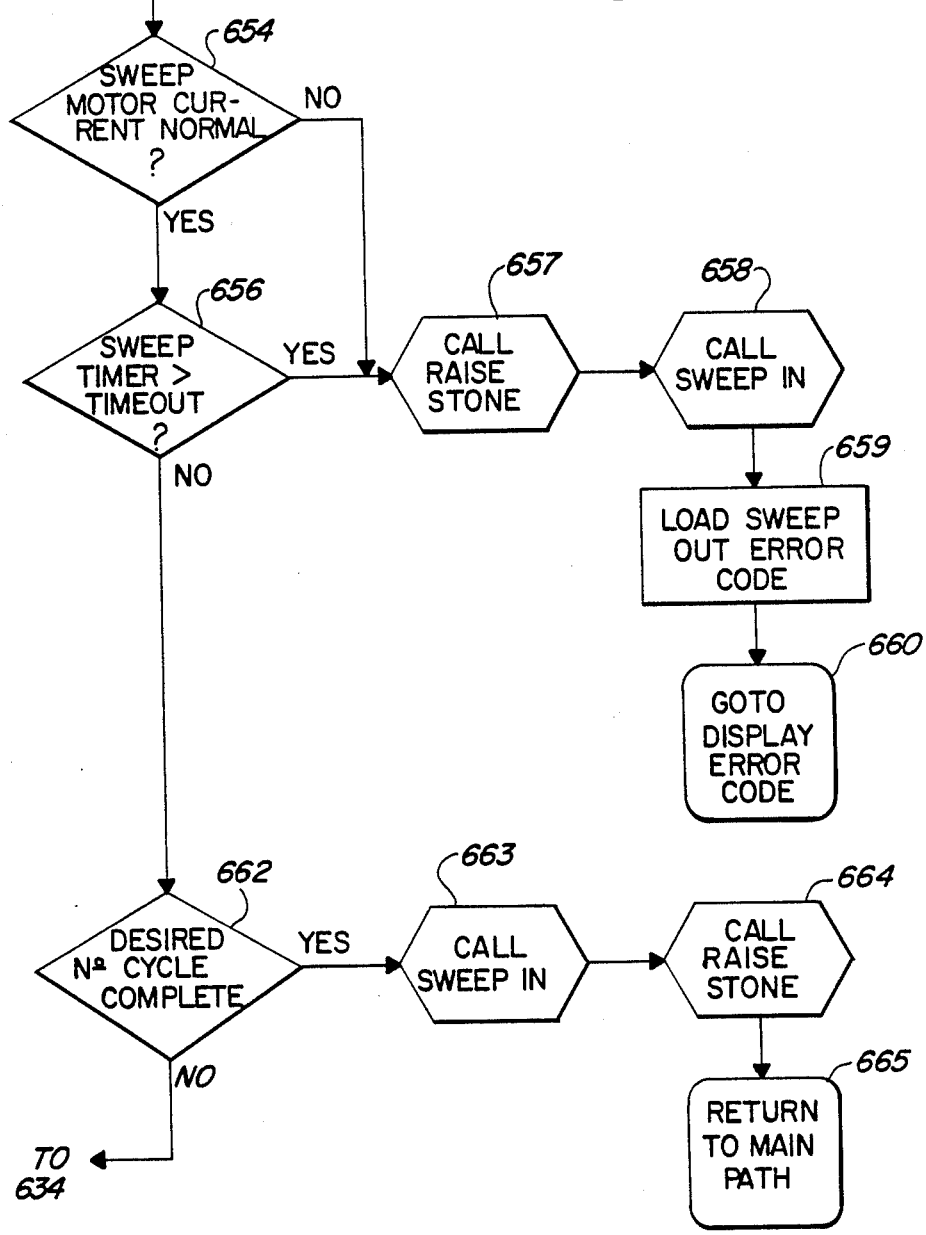

Referring now to FIG. 14e, this portion of the KNIFE SHARPEN subroutine is entered at step 654 which determines whether or not the sweep motor current is normal. If the sweep motor current is not normal, then the algorithm proceeds to steps 657-660 which calls the RAISE STONE subroutine, calls the SWEEP IN subroutine and which causes a sweep out error message to be displayed. If the sweep motor current is normal, then step 654 directs the algorithm to step 656 which determines whether the sweep timer has timed out. If the sweep timer has timed out, then step 656 directs the algorithm once again to steps 657-660 previously described. If, on the other hand, the sweep timer has not timed out, then it means that less than 12 seconds have elapsed while the stone is being moved (swept out or in) and step 656 will direct the algorithm to step 662 which determines whether or not the desired number of sharpening cycles have been completed. This is the number set by the operator through adjustment of potentiometer 50 and read in step 608. If the desired number of sharpening cycles have not been completed, then step 662 returns the algorithm back to previously described 634 shown in FIG. 14b. If, on the other hand, the desired number of sharpening cycles have been completed, then step 662 directs the algorithm to steps 663 through 665 which calls the SWEEP IN subroutine, calls the RAISE STONE subroutine and which then returns to the MAIN PATH algorithm.

Figure 15:
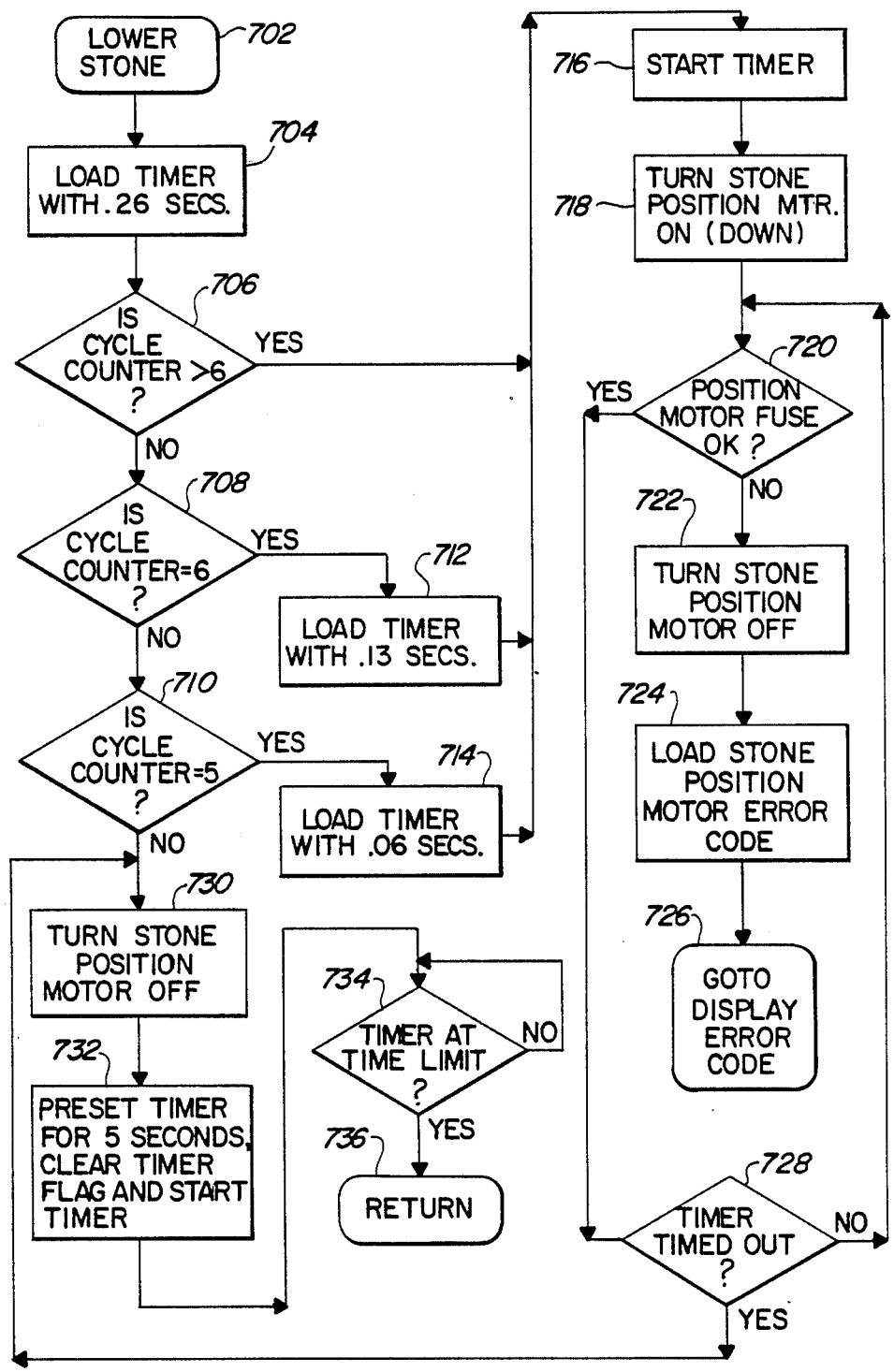
FIG. 15 is a logic flow diagram of a LOWER STONE subroutine.

Referring now to FIG. 15, the LOWER STONE subroutine is entered at step 702. At step 704, a timer is loaded with a value corresponding to the duration (0.26 seconds for example) for which motor 58 must be energized to rotate the input shaft 84 of mechanism 22 by approximately ¼ turn to thereby lower the stone 20 toward the cutterhead 12. Then, step 706 compares the sharpening cycle counter to a value equal to 6. If the sharpening cycle counter value is greater than 6, then it means that more than 6 lateral sweeps of the stone 20 remain to be completed and step 706 directs the algorithm to step 716 which starts the timer countdown, after which step 718 turns the stone position motor 58 on to move the stone down toward the cutterhead. The algorithm then proceeds to step 720 which checks the condition of the position motor fuse. If the fuse condition is not normal, then the algorithm preceeds to steps 722-726 which turns the stone position motor 58 off and which causes a stone position motor error message to be displayed. If, on the other hand, the stone position motor fuse is okay, then step 720 directs the algorithm to step 728 which determines whether or not the timer has timed out. If the timer has not timed out, then the algorithm is directed back again to step 720. Otherwise, step 728 directs the algorithm ahead to step 730.

Referring once again to step 706, if the number of sharpening cycles remaining to be performed is 6 or less, then the algorithm proceeds to step 708. If the number of sharpening cycles to be performed equals 6, then step 708 directs the algorithm to step 712 which loads the stone lowering timer with a value corresponding to 0.13 seconds (corresponding to a ⅛ turn of the input shaft 84) and then the algorithm proceeds to steps 716-736 as previously described.

If, on the other hand, the number of sharpening cycles remaining to be completed is less than 6, then step 708 will direct the algorithm to step 710. If the number of sharpening cycles remaining to be performed equals 5, then step 710 directs the algorithm to step 714 which loads the stone lowering timer with a value corresponding to 0.06 seconds (corresponding to a 1/16th turn of the input shaft 84) and from then, to steps 716-736 as previously described. If the number of sharpening cycles to be performed is less than 5, then step 710 directs the algorithm to step 730 which turns the stone position motor 58 off. The algorithm then proceeds to steps 732 and 734 which operate to cause the sharpening stone to pause at the end of a sweep for 5 seconds before it is swept back in the other direction. Finally, step 736 returns the algorithm to the MAIN PATH.

Thus, assuming that the stone 20 is initially raised in the park position away from the cutterhead 12, that the operator has reversed the rotation of the cutterhead and that the stone sweep motor 60 is fully retracted to the "in" position, then the KNIFE SHARPEN and LOWER STONE subroutines cooperate normally as follows.

First, the stone 20 will be lowered by motor 58 until the knock sensors 34, 36 detect knocking due to impact between the stone 20 and the knives of the cutterhead 12. Then, the stone 20 will be swept laterally across the width of the cutterhead by motor 60 to the "out" position. Then, motor 58 will be turned on for 0.26 seconds to lower the stone 20 a corresponding distance, after which the stone 20 will not move for approximately 5 seconds. The stone 20 will then be swept back across the width of the cutterhead to the "in" position. The stone 20 will be lowered for a duration of 0.26 seconds at the end of each sweep until only 6 sweeps out of the total number (up to 32) of sweep cycles (set by adjustment of potentiometer 50) remain to be completed.

When only 6 sweeps remain to be performed, the motor 58 will be activated for only a 0.13 sec. duration, for example, so that the stone will be lowered only half as far as when it is lowered for 0.26 seconds. When only 5 sweeps remain to be performed, the motor 58 will be activated for only 0.06 seconds to lower the stone a corresponding smaller distance. Finally, after the 5th to last sweep is performed, the stone 20 will not be lowered further, and is merely swept back and forth across the cutterhead 12 without being further lowered. However, the stone will still pause for 5 seconds at the end of every lateral sweep so that even sharpening is achieved across the full width of the cutterhead. When all sharpening sweeps have been completed, the stone will automatically be swept in by sweep motor 60 and then fully raised to the park position by motor 58.

These subroutines also operate to automatically sweep the stone in and raise the stone if, within certain expected time periods, the stone does not reach the "in" or "out" position limits, or if the knock sensors do not detect knocking.

Figure 16:
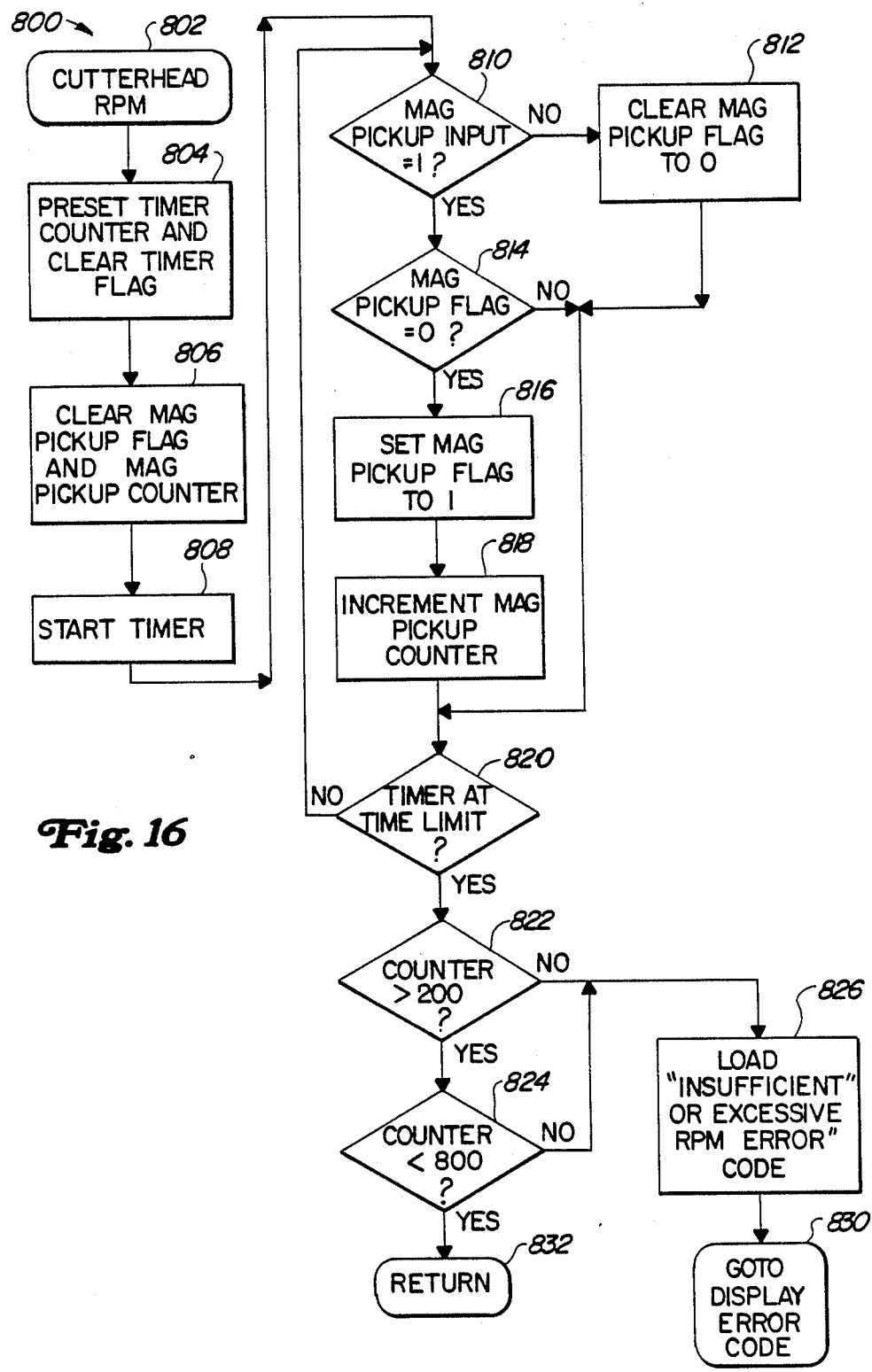
FIG. 16 is a logic flow diagram of a CUTTERHEAD RPM subroutine.

Referring now to FIG. 16, the CUTTERHEAD RPM subroutine 800 determines the rpm of the cutterhead 12 by analyzing the output from mag. pick up 32 and thus counting the number of teeth on the cutterhead drive gear (not shown) which rotate past the mag. pick up during a ½ second time interval established by the presetting of a timer in step 804. Steps 810–818 operate to increment a counter as each tooth passes by the mag. pick up and steps 820–832 operate (at the end of the ½ second interval) to return to the MAIN PATH or to generate and display an error message if the measured cutterhead rpm is outside of certain limits.

Figure 17:
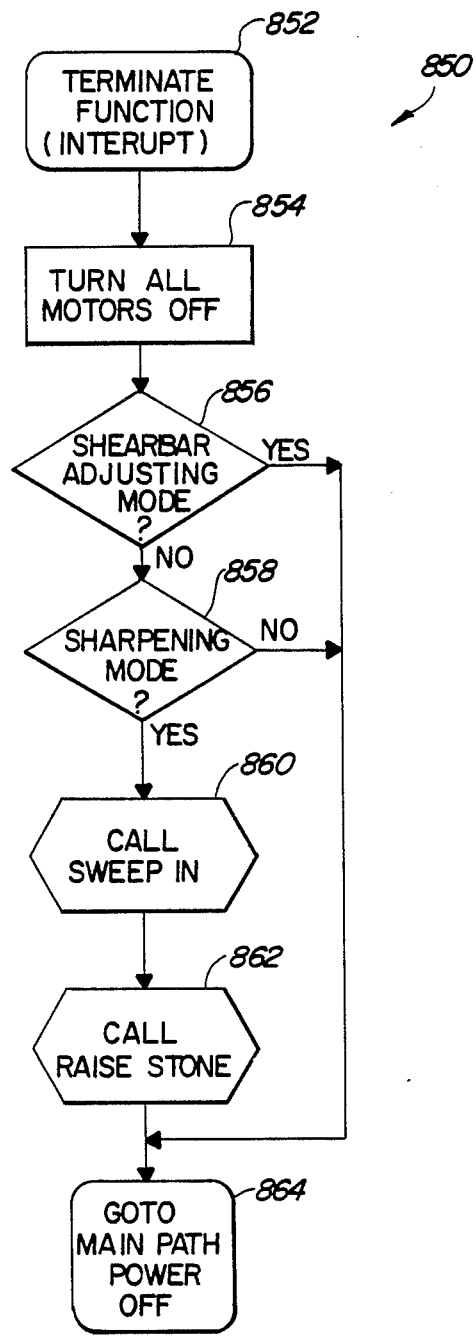
FIG. 17 is a logic flow diagram of a TERMINATE FUNCTION subroutine.

Referring now to FIG. 17, the TERMINATE subroutine 850 operates to turn all of the motors 54, 56, 58 and 60 off in response to an operator induced closing of the terminate switch 49. If the system happens to be in the automatic knife shapening mode when switch 49 is closed, then steps 858–862 will cause sweep motor 60 to sweep the stone 20 in and will cause position motor 58 to raise the stone 20 to the park position before returning to the MAIN PATH.

Figure 18:
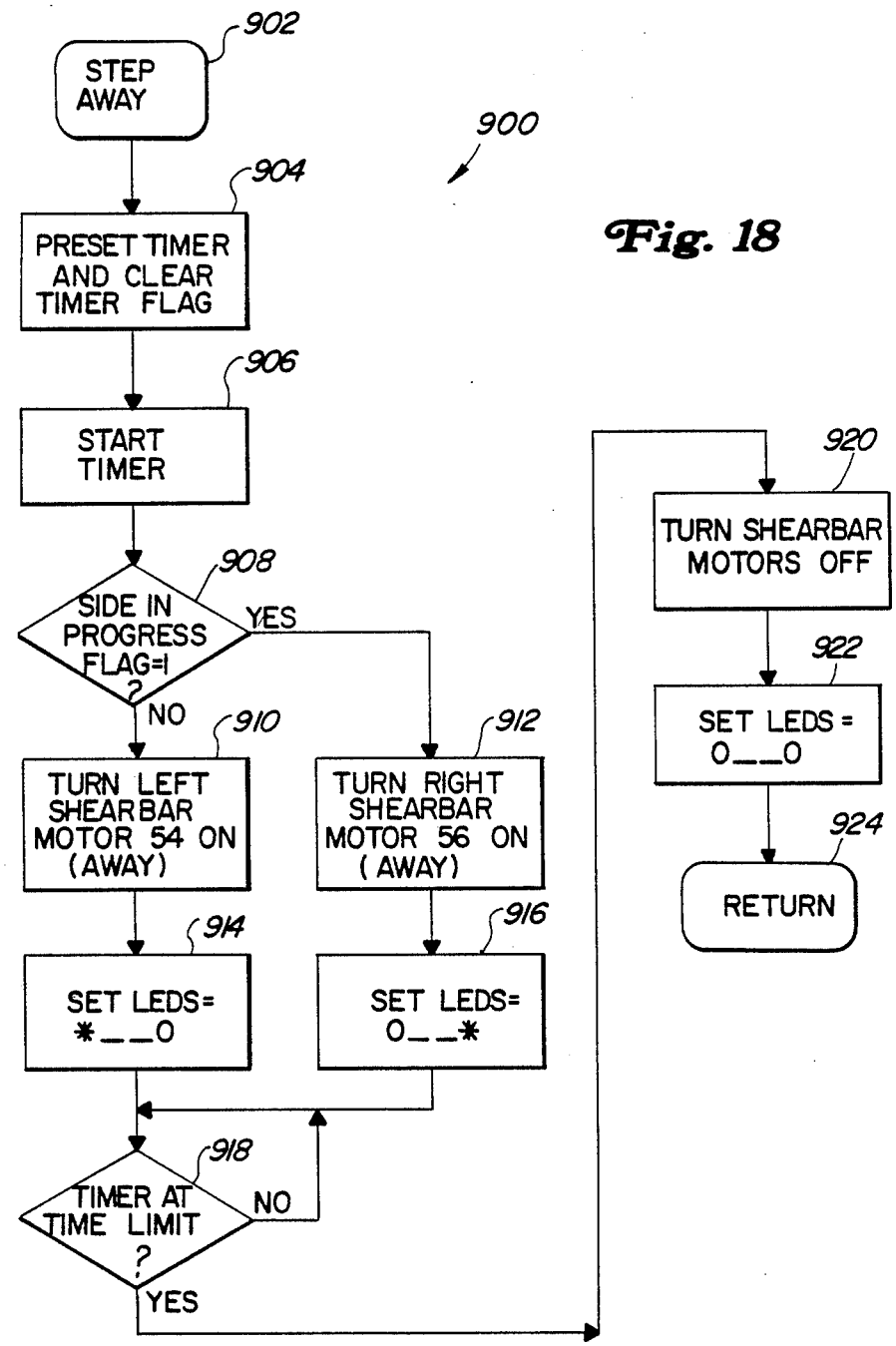
FIG. 18 is a logic flow diagram of a STEP SHEARBAR AWAY subroutine.
Figure 19A:
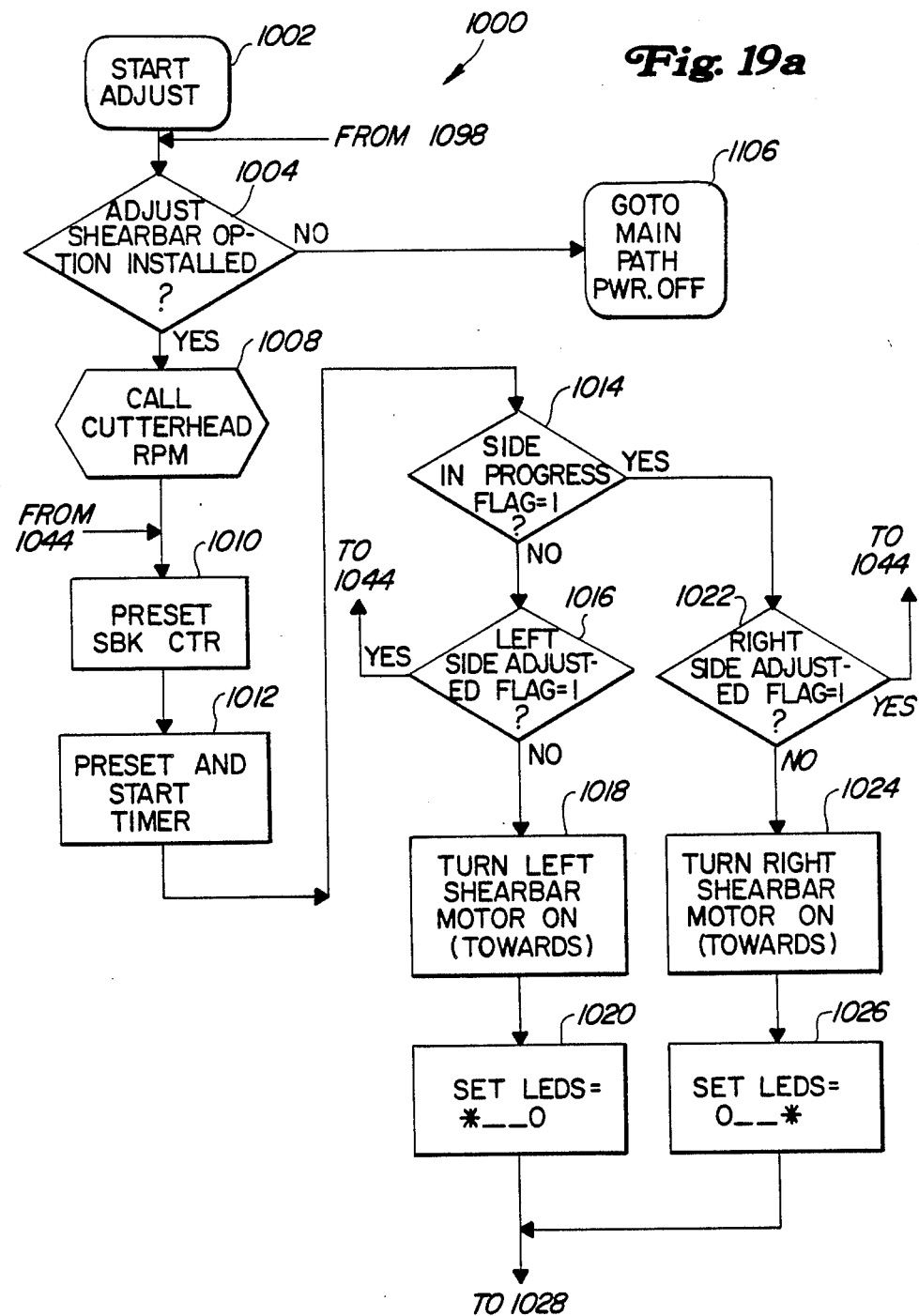
FIGS. 19a-19e are logic flow diagrams of a SHEARBAR ADJUST subroutine.
Figure 19B:
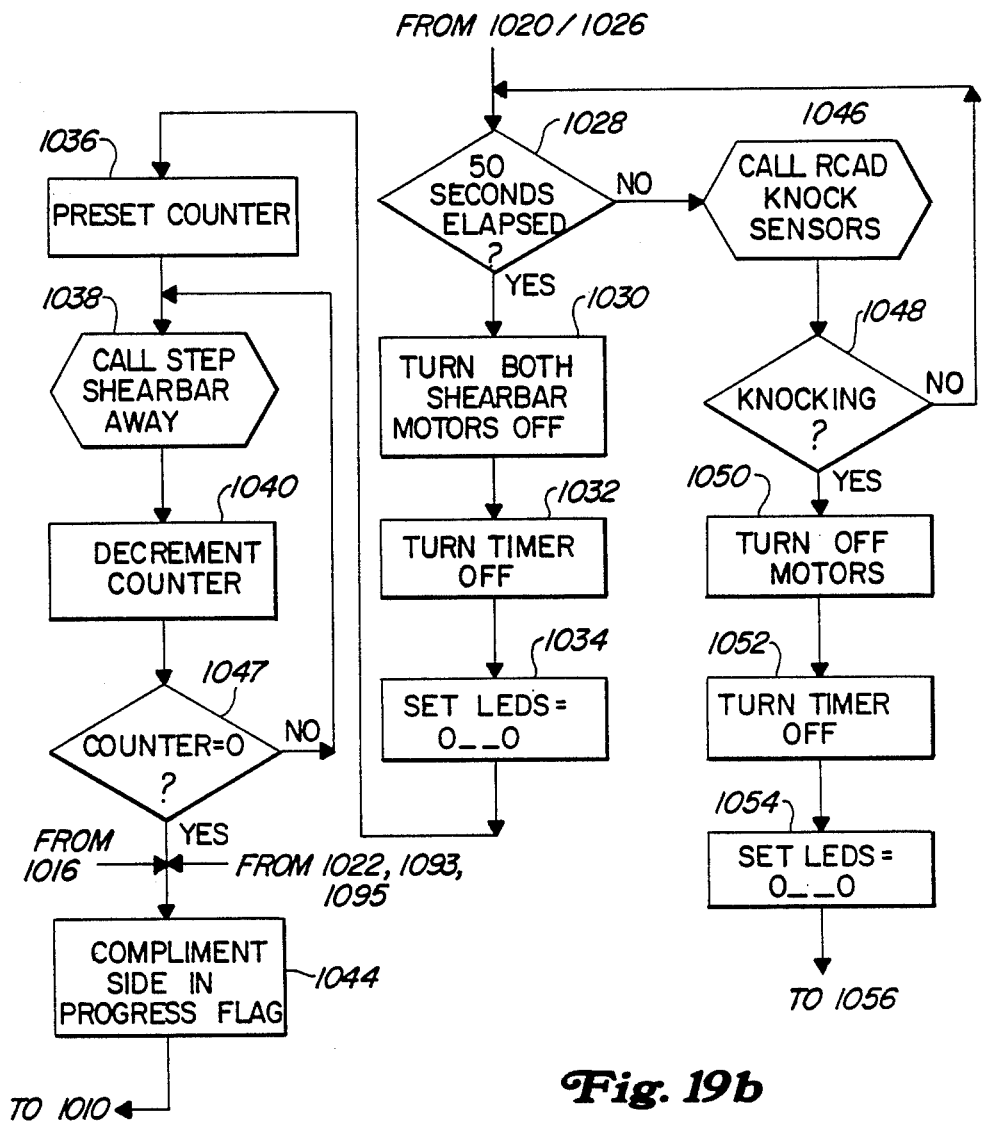
Figure 19C:
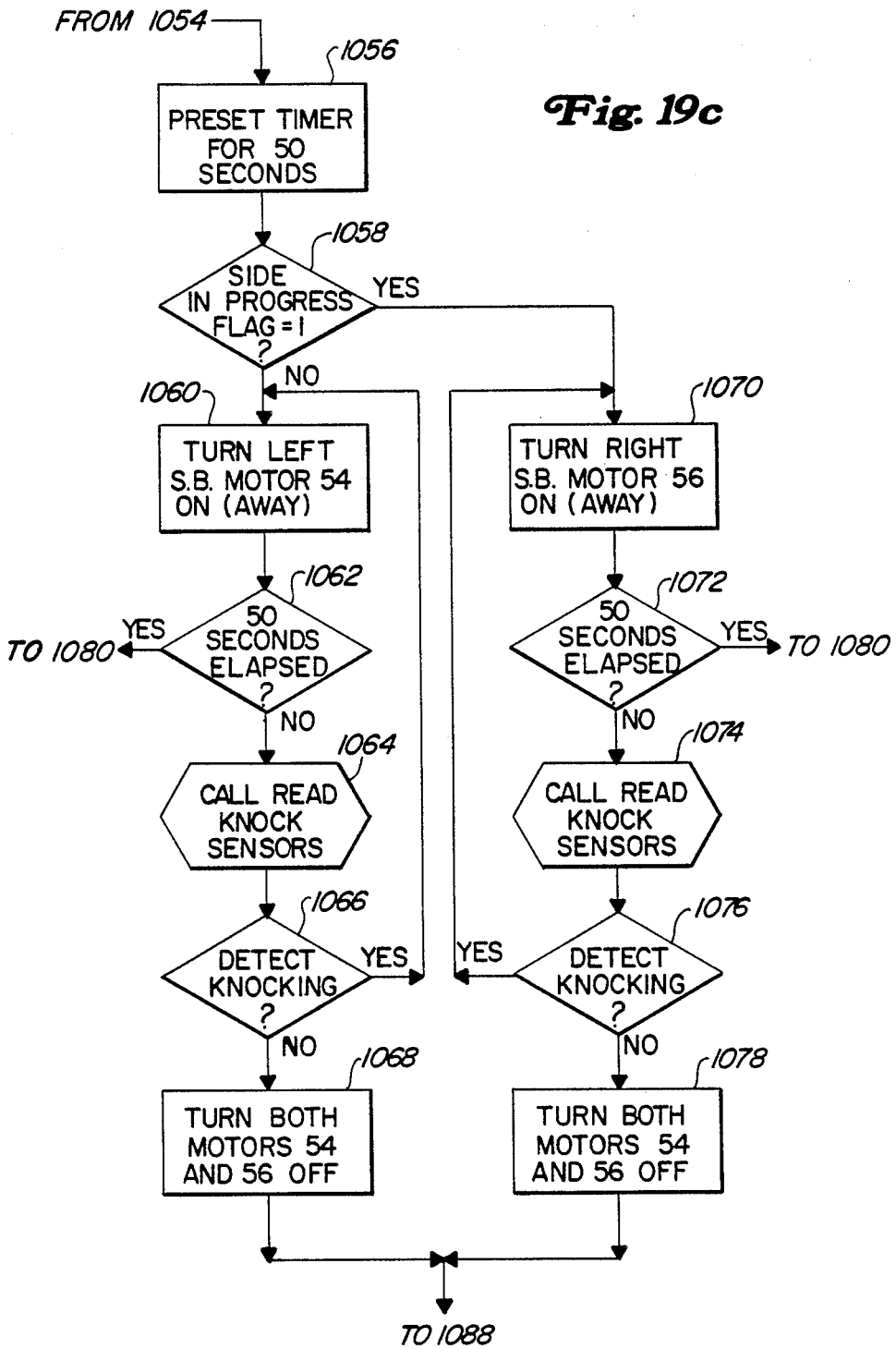
Figure 19D:
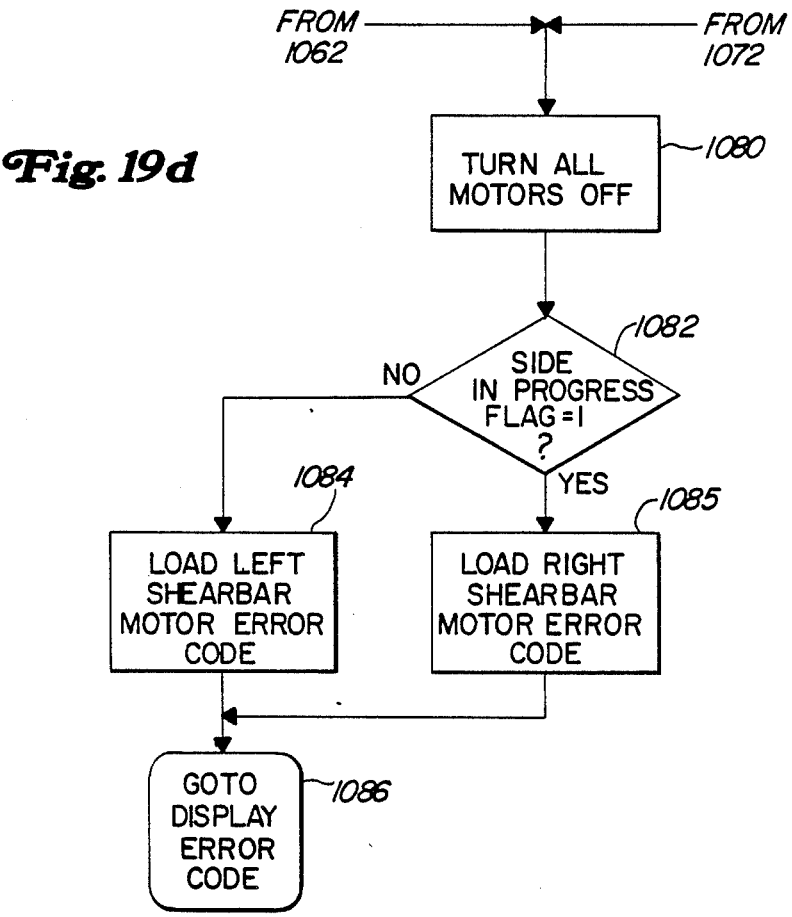
Figure 19E:
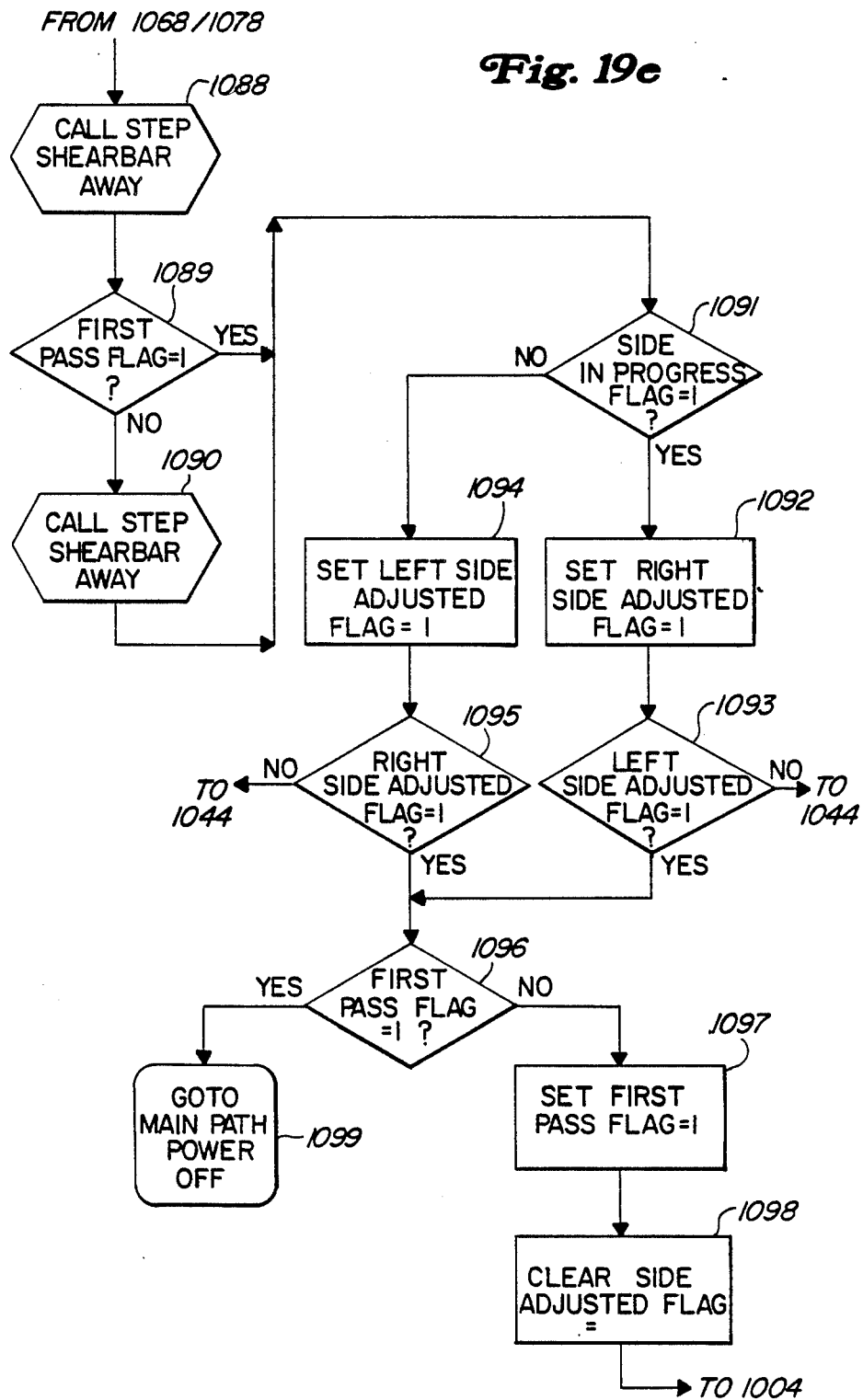

Referring now to FIG. 18, the STEP SHEARBAR AWAY subroutine 900 (called by the SHEARBAR ADJUST subroutine) includes steps 902–924 which operate to energize (for a ½ second time interval) either the left shearbar motor 54 (step 910) or the right shearbar motor 56 (step 912), depending upon the value of a "side in progress" flag determined in step 908. This ½ second interval corresponds to a 180 degree rotation of bolt 17 or 19 (FIG. 1). The "side in progress" flag is initially 0 and is subsequently controlled by the SHEARBAR ADJUST subroutine, as will be described later. Steps 914 and 916 operate to energize different ones of LEDs 52 depending oupon which of motors 54 or 56 is energized.

After the bolts 17 or 19 have been rotated for ½second then step 918 directs the algorithm to step 920 which turns off both motors 54 and 56 and to step 922 which turns off both LEDs, (which were energized by step 914 or 916). Step 924 then returns the algorithm to the SHEARBAR ADJUST subroutine.

Referring now to FIGS. 19a–19e, the ADJUST SHEARBAR subroutine 1000 is entered at step 1002. Then, if the control unit has been installed on a vehicle without an automatic shearbar adjusting option, then step 1004 directs the algorithm to step 1006 which causes the algorithm to return to step 248 of the MAIN PATH algorithm at which all power is turned off. If the shearbar adjusting option has been installed, then step 1004 directs the algorithm to step 1008 which calls the CUTTERHEAD RPM subroutine previously described with respect to FIG. 16. The algorithm then proceeds to step 1010 which presets a shearbar stepback counter to the value 50. Next, in step 1012, a timer is preset to a value corresponding to 50 seconds, and is started. This 50 second time period corresponds to 50 turns of the shearbar adjusting bolts 17 and 19.

Then, step 1014 checks the value of a side in progress flag. This flag was originally cleared or set to 0 in step 204 of the MAIN PATH algorithm. The value of this flag is changed in step 1044 so that the left and right shearbar adjusting motors 54 and 56 will alternately be actuated. If the side in progress flag=0, then the algorithm proceeds from step 1014 to step 1016 which checks the value of a left side adjusted flag. If the left shearbar motor has not been adjusted, then the flag will be 0 and the algorithm proceeds to step 1018 which turns the left shearbar motor 54 on to move the left side of the shearbar 14 towards the cutterhead. Then, step 1020 energizes one of LEDs 52 to indicate to the operator that the left shearbar motor is being actuated. If, on the other hand, in step 1016, if the left side adjusted flag=1, then it means that the left side of the shearbar was already adjusted and the algorithm proceeds directly to step 1044.

Referring back to step 1014, if the side in progress flag=1, then it means that the right side of the shearbar is to be adjusted and the algorithm proceeds from step 1014 to step 1022 which checks the right side adjusted flag. If the right side has been adjusted, then step 1022 directs the algorithm again to step 1044. If the right side has not been adjusted, then the algorithm proceeds from step 1022 to step 1024 which turns the right sheabar motor 56 on to move the right side of the shearbar 14 towards the cutterhead 12 and step 1026 energizes a different one of LEDs 52 to indicate to the operator that the right side of the shearbar 14 is being adjusted.

From steps 1020 or 1026, the algorithm proceeds to step 1028 which determines whether or not the 50 second time period established in step 1012 has elapsed. If 50 seconds have not elapsed, then step 1028 directs the algorithm to step 1046 which calls the READ KNOCK SENSOR subroutine and then to step 1048. If knocking has not been detected by the knock sensors 34, 36, then step 1048 returns the subroutine back to step 1028 again. If knocking has been detected, then step 1048 directs the subroutine to step 1050 which turns both shearbar motors 54, 56 off, to step 1052 which turns the timer off, and then to step 1054 which turns both the outer LEDs off and then to step 1056 which will be described later.

Referring again to step 1028, if the 50 second time period has elapsed, then the algorithm is directed to step 1030 which turns both shearbar motors off and then to step 1032 which turns the timer off, then to step 1034 which turns both LEDs off, then the algorithm proceeds to steps 1036–1042 which cause the STEP SHEARBAR AWAY subroutine previously described with respect to FIG. 18 to be called 50 times in a row. Then, the algorithm proceeds to step 1044 which changes the side in progress flag from 0 to 1 or from 1 to 0 (as the case may be), after which the algorithm proceeds back to step 1010 until the knock sensors detect knocking or until a 50 second time period has elapsed, whereupon the left shearbar motor 54 is then turned off and then this process is repeated for the right side of the shearbar.

Thus, this portion of the subroutine will operate to alternately move the left and right sides of the shearbar 14 towards the cutterhead 12 for 50 second intervals, until knocking is detected (presumably due to contact between the shearbar and the cutterhead). If knocking is detected, then step 1048 will cause motors 54 and 56 to be turned off and the algorithm eventually proceeds to step 1056.

Step 1056 presets and enables a timer to a value corresponding to 50 seconds. If the left side is being adjusted, then step 1058 directs the algorithm to steps 1060 1068. Steps 1060–1068 operate to back the left side of the shearbar 14 away from the cutterhead until knocking is no longer detected, whereupon both motors 54 and 56 are turned off. If the left side of the shearbar 14 is moved away for 50 seconds and knocking is still being detected, then step 1062 directs the algorithm to steps 1080–1086 which turn off the motors 54, 56, and generate and display left or right side (as appropriate) error codes. Steps 1070–1078 and 1080–1086 operate in a similar manner with respect to the right side of the shearbar 14.

From steps 1068 or 1078, the algorithm will proceed to step 1088 which calls the STEP SHEARBAR AWAY subroutine. Thus, each side of the shearbar 14 will be backed away from the cutterhead until knocking ceases, and then that same side will be backed away an additional certain distance. If the "first pass" flag is 0 (as it is initially), then step 1089 will direct the algorithm to step 1090 which again calls the STEP SHEARBAR AWAY subroutine which further increases the clearance between the shearbar 14 and the cutterhead 20. If the "first pass" flag is 1 (due to the previous execution of step 1097), then the shearbar cutterhead gap is left at this smaller size and the algorithm proceeds to step 1091.

If the left side is being adjusted, then step 1091 directs the routine to step 1094 which sets a "left side adjusted" flag to 1 to indicate that the left side of the shearbar has been adjusted. If the right side has not been adjusted, then step 1095 directs the algorithm to step 1044 which changes the "side in progress" flag so that the right side will be adjusted next. If the right side of the shearbar 14 has been adjusted, then step 1091 will direct the routine to step 1092 which sets a "right side adjusted" flag equal to 1. Then, if the left side has not been adjusted, step 1093 will return the algorithm to step 1044 and then to step 1010 so that the left side can be adjusted next.

If both sides of the shearbar have been only adjusted to the larger gap (by operation of step 1090), then from either step 1093 or 1095, the algorithm will proceed to step 1096, and because the "first pass" flag value will be equal to 0, step 1096 will direct the algorithm to step 1097 which sets the "first pass" flag equal to 1 and to step 1098 which clears the "side adjusted" flag and returns the subroutine to step 1004. Thus, during the next pass through the subroutine, step 1089 will cause the side of the shearbar being adjusted to be left at the smaller clearance from the cutterhead, after which the other side of the shearbar will be adjusted to the smaller clearance.

After both sides of the shearbar have been adjusted to the smaller clearance (0.009 inches, for example), then the shearbar adjustment is complete and step 1096 will direct the algorithm to step 1099 which returns the algorithm to step 248 of the MAIN PATH algorithm, whereupon all motors are turned off.

While the invention has been described in conjunction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

I claim:

1. In a material processing machine having a rotatable cutterhead and a shearbar adjacent thereto for processing material introduced therebetween, acoustic sensor means for sensing contact between he cutterhead and the shearbar, a mechanism for moving the shearbar towards and away from the cutterhead and a control system cooperating with the acoustic sensor means and with the mechanism to automatically adjust clearance between the cutterhead and shearbar, characterized by:

the acoustic sensor means comprising first and second spaced-apart knock sensors fixed to the shearbar, each generating signals in response to vibrations received thereby; and means operable during adjustment of the shearbar-cutterhead clearance for comparing the signal from the first knock sensor to a first threshold, for comparing the signal from the second knock sensor with a second threshold, and for preventing clearance adjustment if either knock sensor signal exceeds its threshold while the other knock sensor signal is less than its threshold.

2. The control system of claim 1, wherein:
the first threshold has a magnitude which is larger than the magnitude of the second threshold.

3. The control system of claim 1, wherein the means for comparing and preventing comprises:

means for generating a first counter value representing the amount of time during which the first knock sensor signal exceeds the first threshold;

means for generating a second counter value representing the amount of time during which the second knock sensor signal exceeds the second threshold; and means for preventing clearance adjustment if either counter value exceeds a first counter threshold while the other counter value is less than a second counter threshold.

4. In a material processing machine having a rotatable cutterhead and a shearbar adjacent thereto for processing material introduced therebetween, acoustic sensor means for generating a signal representing vibration of the shearbar, a mechanism for moving the shearbar towards and away from the cutterhead and a control system cooperating with the acoustic sensor means and with the mechanism to automatically adjust clearance between the cutterhead and shearbar, characterized by:

means for repetitively sampling the sensor signal, for determining a portion of a certain time period during which the sensor signal exceeds a predetermined threshold, and for generating a knock signal representing contact between the cutterhead and shearbar when the determined portion of the certain time period exceeds a reference time period;

means for sensing rotation of the cutterhead; and means for establishing the length of the certain time period as a function of the rotation of the cutterhead.

* * * * *